United States Patent
Asai et al.

(10) Patent No.: US 11,852,233 B2
(45) Date of Patent: Dec. 26, 2023

(54) TRANSMISSION DEVICE

(71) Applicant: MUSASHI SEIMITSU INDUSTRY CO., LTD., Toyohashi (JP)

(72) Inventors: Ryosuke Asai, Toyohashi (JP); Shinya Matsuoka, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 46 days.

(21) Appl. No.: 17/640,129

(22) PCT Filed: Sep. 11, 2019

(86) PCT No.: PCT/JP2019/035636
§ 371 (c)(1),
(2) Date: Mar. 3, 2022

(87) PCT Pub. No.: WO2021/048939
PCT Pub. Date: Mar. 18, 2021

(65) Prior Publication Data
US 2022/0299104 A1 Sep. 22, 2022

(51) Int. Cl.
F16H 57/04 (2010.01)
F16H 37/08 (2006.01)
(Continued)

(52) U.S. Cl.
CPC ....... F16H 57/0483 (2013.01); F16H 37/082 (2013.01); F16H 57/037 (2013.01);
(Continued)

(58) Field of Classification Search
CPC .. F16H 57/0483; F16H 37/082; F16H 57/037; F16H 57/0421; F16H 57/0428; F16H 57/0436; F16H 2057/02052
(Continued)

(56) References Cited

U.S. PATENT DOCUMENTS

| 11,047,467 | B2 | 6/2021 | Matsuoka | |
|---|---|---|---|---|
| 2005/0009662 | A1* | 1/2005 | Sudou | F16H 48/08 74/606 R |
| 2007/0004262 | A1* | 1/2007 | Imbert | F16H 57/0483 439/344 |

FOREIGN PATENT DOCUMENTS

| JP | 3287972 B2 | 6/2002 |
|---|---|---|
| JP | 2018-128078 A | 8/2018 |

OTHER PUBLICATIONS

Office Action, Notification of Reasons for Refusal, dated Mar. 8, 2023, issued in the corresponding Japanese Patent Application No. 2021-545021 and the English translation thereof.

(Continued)

*Primary Examiner* — Colby M Hansen
(74) *Attorney, Agent, or Firm* — Carrier, Shende & Associates P.C.; Fulchand P. Shende; Joseph P. Carrier

(57) ABSTRACT

A transmission device includes a planetary reduction gear and a differential device, wherein a carrier of the reduction gear is dividedly formed from a first carrier portion that supports one end side of a pivot shaft and a second carrier portion that supports the other end side of the pivot shaft, and has a power-transmission case that is supported on a transmission case and includes a power-transmission case main body in which the differential case and the second carrier portion are integrated and the first carrier portion, which is joined to one end wall of the power-transmission case main body, a bearing boss portion is integrally and projectingly provided on a side face, on the sun gear side, of the one end wall, the bearing boss portion extending toward the sun gear side and having an outer peripheral part of one of output shafts rotatably fitted into and supported thereby, the bearing boss portion is present at a position where it overlaps the sun gear at least partially in an axial direction, (Continued)

and an outer peripheral part of the bearing boss portion is relatively rotatably fitted into a center hole of the sun gear.

11 Claims, 11 Drawing Sheets

(51) Int. Cl.
*F16H 57/037* (2012.01)
*F16H 57/02* (2012.01)

(52) U.S. Cl.
CPC ..... *F16H 57/0421* (2013.01); *F16H 57/0428* (2013.01); *F16H 57/0436* (2013.01); *F16H 2057/02052* (2013.01)

(58) Field of Classification Search
USPC .......................................................... 475/160
See application file for complete search history.

(56) References Cited

OTHER PUBLICATIONS

Office Action dated Jun. 16, 2023 issued in the corresponding Chinese Patent Application No. 201980100277.2 with the English machine translation thereof.

\* cited by examiner

TRANSMISSION DEVICE

TECHNICAL FIELD

The present invention relates to a transmission device, and in particular to a transmission device that includes a reduction gear having a sun gear, a ring gear that is disposed concentrically with the sun gear, a plurality of planetary gears that mesh with the sun gear and the ring gear, and a carrier that rotatably supports the plurality of planetary gears via respective pivot shafts, and a differential device having a differential case that receives rotational power from the reduction gear and a differential mechanism that is disposed within the differential case and distributes the rotational power between a pair of output shafts while allowing differential rotation, the sun gear and the differential case being disposed on the same axis.

In the present invention and the present specification, the 'axial direction' means a direction along a central axis (rotational axis) of a power-transmission case, the 'peripheral direction' means a circumferential direction with the central axis of the power-transmission case as a reference, and the 'radial direction' means the direction of a radius with the central axis of the power-transmission case as a reference.

BACKGROUND ART

The transmission device is already known, as disclosed in for example Patent Document 1 below.

PRIOR ART DOCUMENTS

Patent Documents

Patent Document 1: Japanese Patent No. 3287972

SUMMARY OF THE INVENTION

Problems to be Solved by the Invention

In the transmission device of the above Patent Document 1, due to part of a differential case and a carrier being integrated, the area around the differential case (in particular a position adjacent to a sun gear) has insufficient spatial room for a bearing boss portion for supporting an output shaft to be provided lengthwise from the differential case toward the sun gear side. Because of this, such a differential case having no bearing boss portion does not have an advantageous structure in terms of enhancing the rigidity with which the output shaft is supported or the rigidity with which the sun gear is supported.

The present invention has been proposed in light of the above circumstances, and it is an object thereof to provide a transmission device that can solve the above problems with a simple structure.

Means for Solving the Problems

In order to attain the above object, according to a first aspect of the present invention, there is provided a transmission device comprising a reduction gear having a sun gear, a ring gear that is disposed concentrically with the sun gear, a plurality of planetary gears that mesh with the sun gear and the ring gear, and a carrier that rotatably supports the plurality of planetary gears via respective pivot shafts, and a differential device having a differential case that receives rotational power from the reduction gear and a differential mechanism that is disposed within the differential case and distributes the rotational power between a pair of output shafts while allowing differential rotation, the sun gear and the differential case being disposed on the same axis, characterized in that the carrier is dividedly formed from a first carrier portion that supports one end side of the pivot shaft and a second carrier portion that supports the other end side of the pivot shaft, the transmission device comprises a power-transmission case that is rotatably supported on a transmission case and comprises a power-transmission case main body in which the differential case and the second carrier portion are integrated and the first carrier portion, which is joined to one end wall of the power-transmission case main body, a bearing boss portion is integrally and projectingly provided on a side face, on the sun gear side, of the one end wall, the bearing boss portion extending toward the sun gear side and having an outer peripheral part of one of the output shafts rotatably fitted into and supported thereby, the bearing boss portion is present at a position where the bearing boss portion overlaps the sun gear at least partially in an axial direction, and an outer peripheral part of the bearing boss portion is relatively rotatably fitted into a center hole of the sun gear.

Further, according to a second aspect of the present invention, in addition to the first aspect, a space part is present between the one end wall and an extremity face of the sun gear, part of the lubricating oil flowing through an interior of the power-transmission case accompanying operation of the reduction gear being able to flow into the space part.

Furthermore, according to a third aspect of the present invention, in addition to the second aspect, an oil passage is provided between mating faces of the sun gear and the bearing boss portion, one end of the oil passage communicating with the space part, and the other end of the oil passage communicating with a section between the center hole and an outer peripheral part of the one output shaft on an outer side in the axial direction of the bearing boss portion.

Moreover, according to a fourth aspect of the present invention, in addition to the second or third aspect, a gear pump chamber is defined between opposing faces of the one end wall of the power-transmission case main body and the first carrier portion, the planetary gear comprises a specific planetary gear portion that has gear teeth closely opposing a peripheral face of the gear pump chamber and rotates within the gear pump chamber, the specific planetary gear portion and the gear pump chamber supply lubricating oil from an outer peripheral side of the power-transmission case toward a center part side, and part of the lubricating oil thus supplied is supplied to the space part.

Further, according to a fifth aspect of the present invention, in addition to the fourth aspect, the planetary gear is a two-stage planetary gear integrally having a first planetary gear portion meshing with the sun gear and a second planetary gear portion formed so as to have a smaller diameter than a diameter of the first planetary gear portion and meshing with the ring gear, and the sun gear and the first planetary gear portion mesh with each other via helical teeth, the helical teeth having a twist angle that pushes out lubricating oil retained by a valley part of the gear teeth of the first planetary gear portion into the space part due to the sun gear and the first planetary gear portion meshing with each other.

Furthermore, according to a sixth aspect of the present invention, in addition to any one of the first to fifth aspects, the first carrier portion has a boss portion protruding outward in the axial direction, and the power-transmission case is rotatably supported on the transmission case via the boss portion.

Effects of the Invention

In accordance with the first aspect, the power-transmission case, which is rotatably supported on the transmission case, is formed from the power-transmission case main body, in which the differential case and the second carrier portion are integrated, and the first carrier portion, which is joined to the outside face of one end wall of the power-transmission case main body, the bearing boss portion, which has an outer peripheral part of one of the output shafts fitted into and supported thereby, is integrally and projectingly provided on a side face, on the sun gear side, of the one end wall of the power-transmission case main body, the bearing boss portion is present at a position where it overlaps the sun gear in the axial direction, and an outer peripheral part of the bearing boss portion is fitted into the center hole of the sun gear. This not only enables the bearing boss portion, which is long in the axial direction and into which is fitted and which supports the outer peripheral part of the output shaft, to be easily machined on the split face of the power-transmission case, in particular on a side face of the one end wall of the power-transmission case main body that can be widely exposed to the outside, but also enables the output shaft to be stably fitted into and supported by the long bearing boss portion. Moreover, since the bearing boss portion can also function as means for supporting the sun gear due to it being fitted into the center hole of the sun gear, the rigidity with which the sun gear is supported can be enhanced with a simple structure. Furthermore, due to the bearing boss portion overlapping the sun gear in the axial direction, the increase in the axial dimension of the power-transmission case accompanying the bearing boss portion being projectingly provided is suppressed, and it is therefore advantageous in terms of reducing the axial dimension of the device.

Furthermore, in accordance with the second aspect, since the space part is present between the one end wall of the power-transmission case main body and the extremity face of the sun gear, part of the lubricating oil flowing through the interior of the power-transmission case accompanying operation of the reduction gear being able to flow into the space part, it becomes possible for lubricating oil to be supplied via the space part toward the part where the sun gear is fitted to the bearing boss portion, thus enabling the fitted part to be lubricated without problems.

Moreover, in accordance with the third aspect, since the oil passage is provided between the mating faces of the sun gear and the bearing boss portion, one end of the oil passage communicating with the space part, and the other end of the oil passage communicates with a section between the center hole of the sun gear and an outer peripheral part of the one output shaft on the outer side in the axial direction of the bearing boss portion, even if the outer peripheral part of the bearing boss portion is fitted to the sun gear and the one output shaft is not exposed within the transmission case or the power-transmission case, the lubricating oil within the power-transmission case can be supplied to the part where the one output shaft is fitted to the bearing boss portion through the space part and the oil passage, and the fitted part can be lubricated without problems.

Further, in accordance with the fourth aspect, since part of the lubricating oil that has been fed from the outer peripheral side of the power-transmission case toward the center part side by means of the specific planetary gear portion and the gear pump chamber is supplied to the space part, it becomes possible to supply more effectively lubricating oil toward a part where the sun gear is fitted to the bearing boss portion. Furthermore, since the planetary gear functions also as a pump gear, it is possible to simplify the structure, and consequently to contribute to a reduction in cost.

Moreover, in accordance with the fifth aspect, since the sun gear and the first planetary gear portion are meshed with each other via the helical teeth, and the lubricating oil retained in the valley part of the gear teeth of the first planetary gear portion is pushed out to the space part accompanying the meshing due to a twist angle being set for the helical teeth, it becomes possible for lubricating oil fed by means of the specific planetary gear portion and the gear pump chamber to efficiently reach the space part.

Furthermore, in accordance with the sixth aspect, in an arrangement in which the first carrier portion has the boss portion protruding outward in the axial direction, and the power-transmission case is rotatably supported on the transmission case via the boss portion, the same effects as those of the first aspect can be achieved.

EXPLANATION OF REFERENCE NUMERALS AND SYMBOLS

Figure 1:
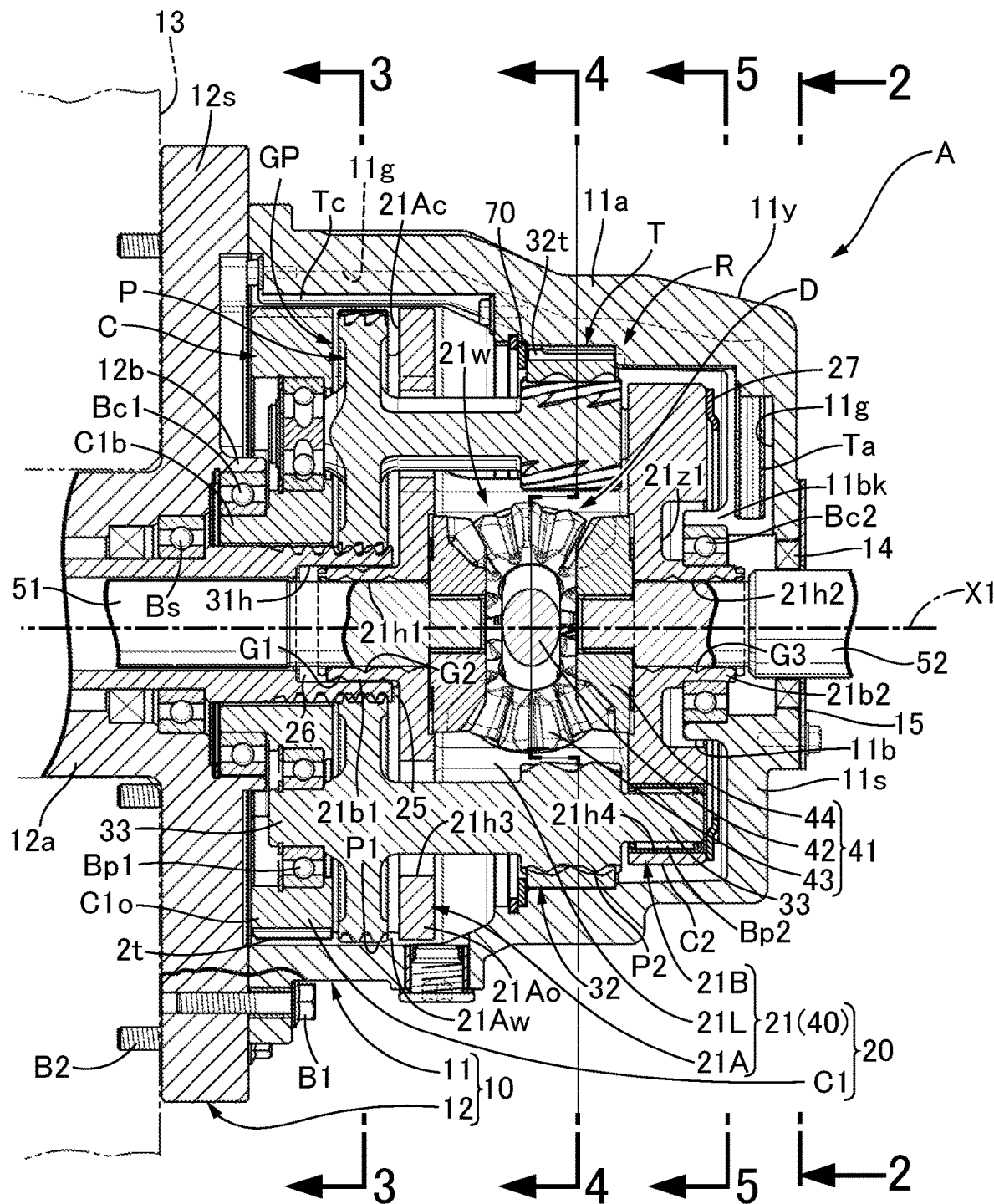
FIG. 1 is an overall sectional view (a sectional view along line 1-1 in FIG. 2) of a transmission device related to one embodiment of the present invention. (first embodiment)
Figure 2:
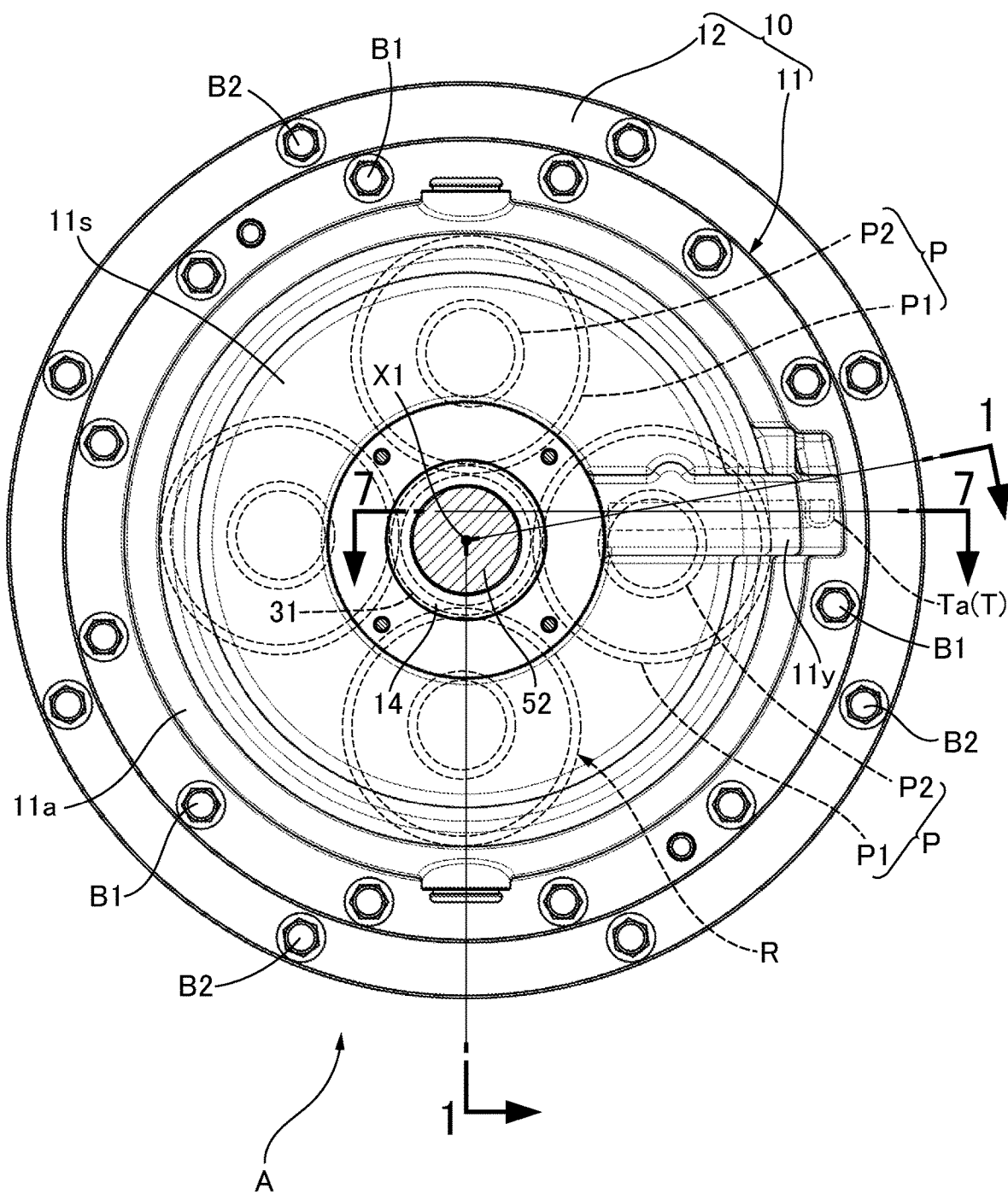
FIG. 2 is a sectional view along line 2-2 in FIG. 1. (first embodiment)

A Transmission device
C Carrier
C2 First and second carrier portions
C1*b* Boss portion
D Differential device
G1 Oil passage
GP Gear pump
P Planetary gear
P1, P2 First and second planetary gear portions R Reduction gear
X1 Rotational axis as same axis
10 Transmission case
20 Power-transmission case
21 Power-transmission case main body
21A First end wall as one end wall
21b1 First bearing boss portion as bearing boss portion
25 First space part as space part
28 Gear pump chamber
31 Sun gear
31h Center hole of sun gear
32 Ring gear
33 Pivot shaft
40 Differential case
41 Differential gear mechanism as differential mechanism
51, 52 First and second output shafts as pair of output shafts

MODES FOR CARRYING OUT THE INVENTION

An embodiment of the present invention is explained below by reference to the attached drawings.

First Embodiment

First, in FIG. 1 to FIG. 6, a transmission device A mounted on a vehicle, for example an automobile, includes a transmission case 10 that is fixedly supported on a support part 13 (for example, a vehicle body), a power-transmission case 20 that is rotatably housed and supported within the transmission case 10, a reduction gear R that is disposed within the power-transmission case 20 and that reduces in speed and transmits power from a power source (for example, a vehicle-mounted electric motor), which is not illustrated, and a differential device D that is similarly disposed within the power-transmission case 20 and distributes and transmits the output of the reduction gear R between first and second output shafts 51, 52 while allowing differential rotation. The first and second output shafts 51, 52 are coupled to left and right driven wheels via a coupling mechanism, which is not illustrated, so as to rotate them.

The transmission case 10 is formed dividedly in the axial direction from for example a bottomed cylindrical transmission case main body 11 and a lid body 12 that blocks the open end of the transmission case main body 11. The transmission case main body 11 is formed so that its barrel portion 11a gradually (stepwise in the illustrated example) has a smaller diameter in going closer to an end wall portion 11s. An intermediate part of the second output shaft 52 is fitted into a center hole of the end wall portion 11s via a seal member 14. A cover plate 15 for protecting and supporting the seal member 14 is secured by a screw to the end wall portion 11s.

On the other hand, the lid body 12 includes a disk-shaped end plate portion 12s detachably joined to the open end of the transmission case main body 11 by means of a plurality of bolts B1, and a barrel portion 12a integrally and projectingly provided on an outside face of the end plate portion 12s. The end plate portion 12s is detachably fixed to the support part 13 by means of a plurality of bolts B2.

The power-transmission case 20 is supported, via first and second case support bearings Bc1, Bc2, on first and second support boss portions 12b, 11b projectingly provided on inner faces of opposite end walls of the transmission case 10 (more specifically, the end plate portion 12s and the end wall portion 11s) so as to face inward, so that the power-transmission case 20 can rotate around a first axis X1. The first axis X1 becomes a rotational axis of the power-transmission case 20. The power-transmission case 20 can be inserted into the transmission case main body 11 from the outside in the axial direction through mutually opposing faces of the transmission case main body 11 and the lid body 12 (that is, the open end of the transmission case main body 11).

The power-transmission case 20 of the present embodiment is dividedly formed from a power-transmission case main body 21 as a main part, and part of the reduction gear R (that is, a first carrier portion C1 described later) detachably joined to a disk-shaped first end wall (that is, one end wall) 21A of the power-transmission case main body 21 by means of a plurality of bolts B3.

The power-transmission case main body 21 includes the first end wall 21A, a disk-shaped second end wall 21B opposing the first end wall 21A across a gap in the axial direction, and a plurality (two in the illustrated example) of linking walls 21L integrally joining the first and second end walls 21A, 21B. The linking wall 21L is present at a position different in the peripheral direction from a planetary gear P and a pivot shaft 33, which are described later, of the reduction gear R.

The power-transmission case main body 21 functions as a differential case 40 of the differential device D due to cooperation between the linking wall 21L and inner half parts in the radial direction of the first and second end walls 21A, 21B. Outward-facing first and second bearing boss portions 21b1, 21b2 are integrally and projectingly provided on outside faces on the center side of opposite end walls of the differential case 40, that is, the first and second end walls 21A, 21B, the first and second output shafts 51, 52 being rotatably fitted into and supported on the first and second bearing boss portions 21b1, 21b2 respectively.

Helical grooves G2, G3 are recessed in at least one of mating faces of the first and second output shafts 51, 52 and the first and second bearing boss portions 21b1, 21b2. These helical grooves G2, G3 exhibit a pumping function of forcibly feeding lubricating oil within the transmission case 10 to the mating faces and adjacent movable parts (for example, a differential gear mechanism 41) within the differential case 40 by exhibiting a screw pump function when relative rotation occurs between the mating faces accompanying forward rotation of the first and second output shafts 51, 52 (vehicle moving forward).

An oil-scooping projection part is projectingly provided on an extremity of each of the first and second bearing boss portions 21b1, 21b2 so as to correspond to outer open ends of the helical grooves G2, G3, the oil-scooping projection part scooping up lubricating oil in the area around the extremity into the interior of the helical grooves G2, G3 when there is relative rotation.

Figure 8:
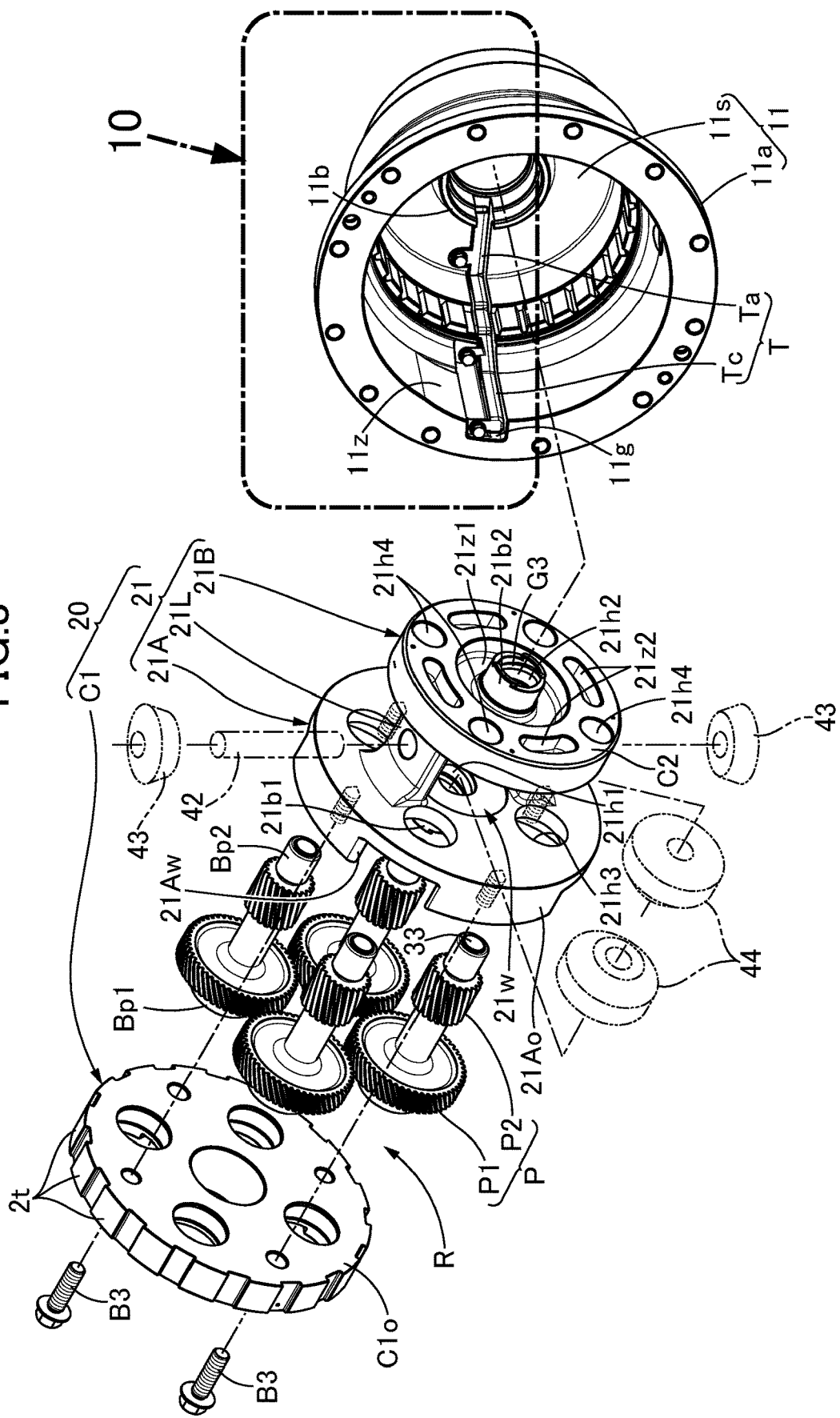
FIG. 8 is an exploded perspective view of the transmission device. (first embodiment)
Figure 9:
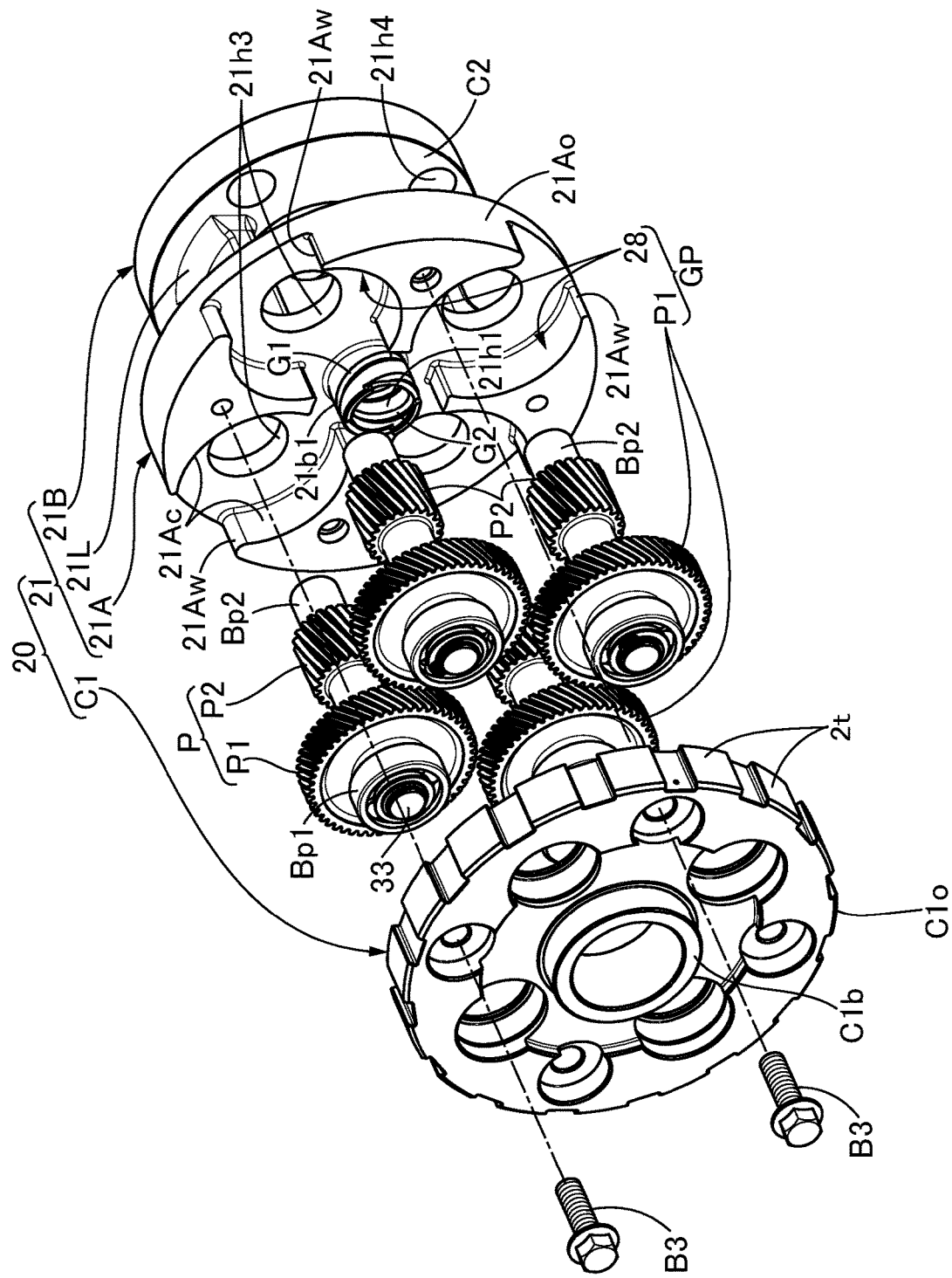
FIG. 9 is an exploded perspective view of an essential part of the transmission device with the transmission case omitted. (first embodiment)

One example of the reduction gear R is now explained by referring in addition to FIG. 8 and FIG. 9. The reduction gear R has a sun gear 31 that faces the interior of the power-transmission case 20, a ring gear 32 that is disposed concentrically with the sun gear 31 at a position offset in the axial direction from the sun gear 31, a plurality (four in the illustrated example) of the planetary gears P, which mesh with the sun gear 31 and the ring gear 32, and a carrier C that rotatably supports the plurality of planetary gears P via the respective pivot shafts 33.

The planetary gear P is a two-stage planetary gear integrally having a first planetary gear portion P1 that meshes with the sun gear 31 and a second planetary gear portion P2 that is formed so as to have a smaller diameter than that of the first planetary gear portion P1, is present at a position close to the second case support bearing Bc2 in the axial direction, and meshes with the ring gear 32, and in the present embodiment the planetary gear P is formed coaxially and integrally with the pivot shaft 33. The first and second planetary gear portions P1, P2, the sun gear 31 and the ring gear 32 have gear teeth (helical teeth in the present embodiment) for generating a thrust load by a reaction force to the meshing.

The outer periphery of an intermediate part of the sun gear 31 is rotatably supported on the transmission case 10 (the lid body 12) via a bearing Bs. An inner peripheral face of the sun gear 31 is rotatably fitted onto and supported on an outer peripheral face of the first bearing boss portion 21$b$1, and the sun gear 31 and the first bearing boss portion 21$b$1 are therefore disposed so that parts thereof overlap in the axial direction. An outer end part, which is not illustrated, of the sun gear 31 is operatively linked to the output side of the power source, which is not illustrated, via the coupling mechanism, which is not illustrated.

A first space part 25 is disposed between an extremity face (that is, an inner end face in the axial direction) of the sun gear 31 and an outside face of the first end wall 21A, part of the lubricating oil that flows within the power-transmission case 20 from the case outer peripheral side toward the center part side in response to operation of the reduction gear R being capable of flowing into the first space part 25. A helical groove-shaped oil passage G1 having one end communicating with the first space part 25 is provided between mating faces of the sun gear 31 and the first bearing boss portion 21$b$1 (in the illustrated example the outer peripheral face of the first bearing boss portion 21$b$1), and the other end of the oil passage G1 opens in a second space part 26 defined between a center hole 31$h$ of the sun gear 31 and an outer peripheral part of the first output shaft 51 on the outer side in the axial direction of the first bearing boss portion 21$b$1. This allows the oil passage G1 to communicate via the second space part 26 with a part where the first bearing boss portion 21$b$1 is fitted to the first output shaft 51, thus enabling lubricating oil to be supplied to the fitted part.

Since the oil passage G1 has a helical groove shape, when relative rotation occurs between the mating faces accompanying forward rotation of the sun gear 31 (vehicle moving forward), in the same manner as for the helical grooves G2, G3, it is possible, by a screw pump action being exhibited, to feed lubricating oil of the first space part 25 toward the second space part 26 side. The oil passage G1 may be formed into a groove shape (for example, a linear groove) other than the helical groove. Although the present embodiment illustrates a case in which the oil passage G1 is provided in the outer peripheral face of the first bearing boss portion 21$b$1, the oil passage G1 may be provided in an inner peripheral face of the sun gear 31.

The ring gear 32 has its outer peripheral face fitted into and fixed (for example, latched by latching means 70 such as a circlip) to an inner peripheral face of an intermediate part, in the axial direction, of the transmission case main body 11 (more specifically, the barrel portion 11$a$). A large number of rotation-preventing projection portions 32$t$ are provided integrally with the outer peripheral face of the ring gear 32 at intervals in the peripheral direction, and the rotation-preventing projection portions 32$t$ relatively non-rotatably engage with a large number of rotation-preventing grooves formed in an inner peripheral face of the barrel portion 11$a$ so as to have a spline groove shape. The ring gear 32 has its internal diameter formed so as to be smaller than the maximum external diameter of the second end wall 21B.

In the present embodiment, the carrier C is dividedly formed from the first carrier portion C1, which supports one end of the pivot shaft 33 of the planetary gear P, that is, the outer end on the first planetary gear portion P1 side, and a second carrier portion C2 that supports the other end of the pivot shaft 33, that is, the outer end on the second planetary gear portion P2 side. The first carrier portion C1 integrally has a boss portion C1$b$ that protrudes outward in the axial direction from the outside face thereof, further outside in the axial direction than the first bearing boss portion 21$b$1. The first case support bearing Bc1 is disposed between the boss portion C1$b$ and the support boss portion 12$b$ on the inner face of the transmission case 10 (the lid body 12), the first case support bearing Bc1 rotatably supporting one end side of the power-transmission case 20.

On the other hand, the second carrier portion C2 is integrated with the second end wall 21B of the power-transmission case main body 21. That is, a half, on the outer side in the radial direction, of the second end wall 21B exhibits a function as the second carrier portion C2.

With regard to the pivot shaft 33 of the planetary gear P, one end part on the first planetary gear portion P1 side is supported on the first carrier portion C1 of the power-transmission case 20 via a first bearing Bp1, and the other end part on the second planetary gear portion P2 side is supported on the second carrier portion C2 of the power-transmission case 20 via a second bearing Bp2. Among the first and second bearings Bp1, Bp2, only the first bearing Bp1 has a bearing structure (for example, a ball bearing) that can receive all of a radial load and a thrust load on one side and the other side in the axial direction. As the second bearing Bp2, a bearing (for example, a needle bearing) that receives only a radial load and does not receive a thrust load is used.

Figure 5:
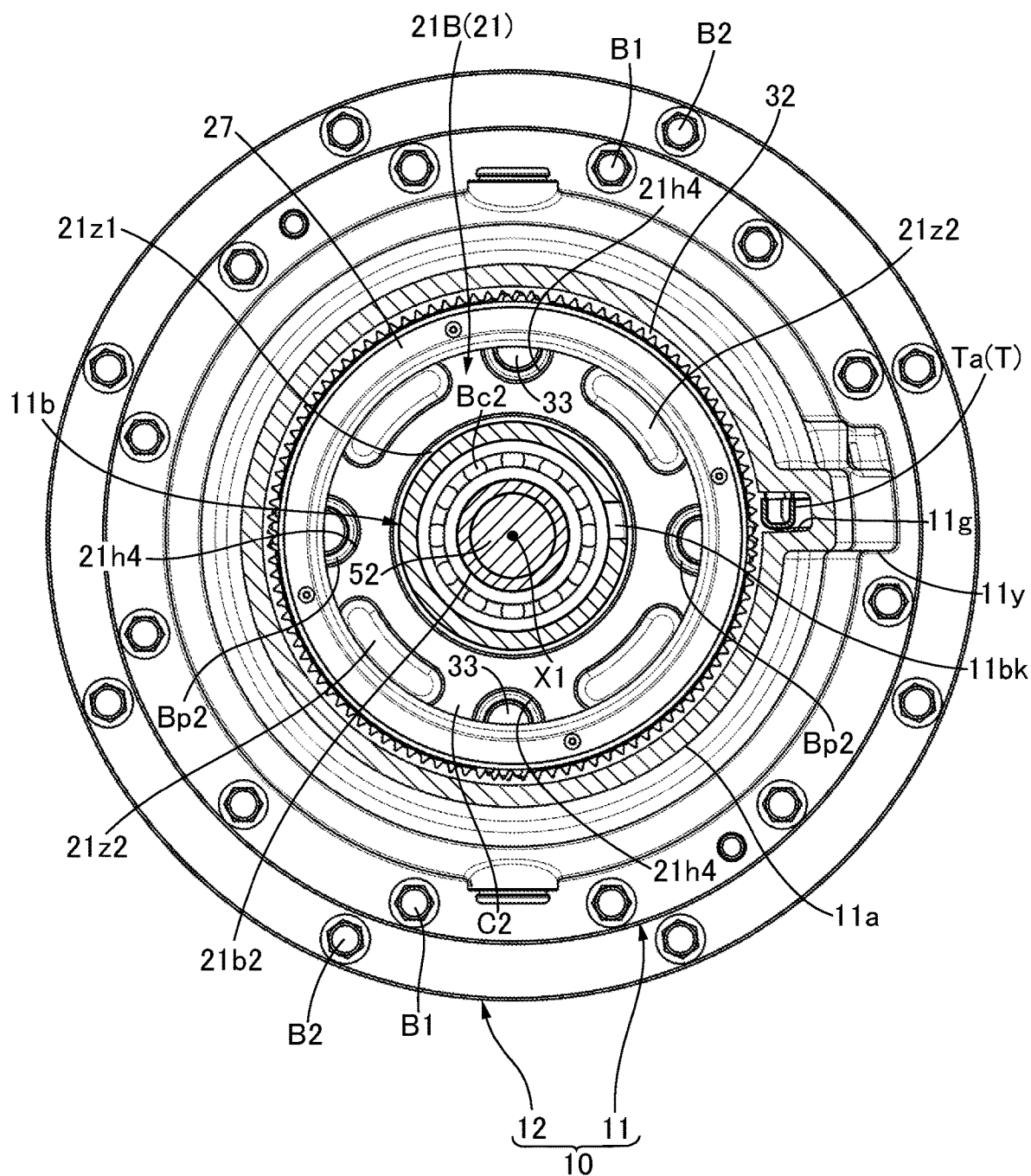
FIG. 5 is a sectional view along line 5-5 in FIG. 1. (first embodiment)

As is clear from FIG. 5 and FIG. 8, the second end wall 21B of the power-transmission case 20, in particular the portion functioning as the second carrier portion C2, includes a plurality of bearing holes 21$h$4 that are formed so as to extend through the second end wall 21B and have the other end of the pivot shaft 33 fitted into and supported thereon via the second bearing Bp2, a recessed place 21$z$1 that is recessed in the outside face of the second end wall 21B further radially inside than the second bearing Bp2 and has its bottom face positioned further inside in the axial direction than the axially outer end of the bearing hole 21$h$4, and the second bearing boss portion 21$b$2, which protrudes outward in the axial direction from the bottom face of the recessed place 21$z$1 and has the second output shaft 52 rotatably fitted into and supported thereon.

The bearing hole 21$h$4 is one example of a pivot shaft support part and also one example of an insertion hole for a second planetary gear, which is described later.

An outer peripheral part of the second bearing boss portion 21$b$2 is supported on the second support boss portion 11$b$, which is projectingly provided on the inner face of the transmission case 10, via the second case support bearing Bc2. Moreover, at least part of each of the second case support bearing Bc2 and the second support boss portion 11$b$ is disposed within the recessed place 21$z$1. In other words, the second case support bearing Bc2, the second support boss portion 11$b$, and the recessed place 21$z$1 are disposed so as to partially overlap the second bearing Bp2 in the axial direction.

A recess portion 21z2 is formed in the outside face of the second end wall 21B, between peripherally adjacent second bearings Bp2, further radially outside than the second bearing boss portion 21b2 and the recessed place 21z1. As is clearly shown in FIG. 5, an annular oil retaining plate 27 as an oil retaining member covering a radially outer part of an opening face of the recess portions 21z2 and a radially outer part of the outer end in the axial direction of the second bearings Bp2 is disposed so as to extend in the peripheral direction while straddling the recess portions 21z2 and the second bearings Bp2. The oil retaining plate 27 is detachably fixed (for example, secured by a screw) to the outside face of the second end wall 21B.

The present embodiment illustrates a case in which the oil retaining plate 27 is formed into an annular shape, and covers the radially outer parts of the opening faces of all of the recess portions 21z2 and the radially outer parts of the outer ends in the axial direction of all of the second bearings Bp2, but the oil retaining plate 27 may be formed into an arc shape extending in the peripheral direction of the second end wall 21B and cover the radially outer parts of the opening faces of some of the recess portions 21z2 and the radially outer parts of the outer ends in the axial direction of some of the second bearings Bp2.

The first planetary gear portion P1 of the planetary gear P is one example of a specific planetary gear portion and is disposed between mutually opposing faces of the first end wall 21A of the power-transmission case main body 21 and the first carrier portion C1. A gear pump chamber 28 housing the first planetary gear portion P1 is defined by the mutually opposing faces.

Figure 3:
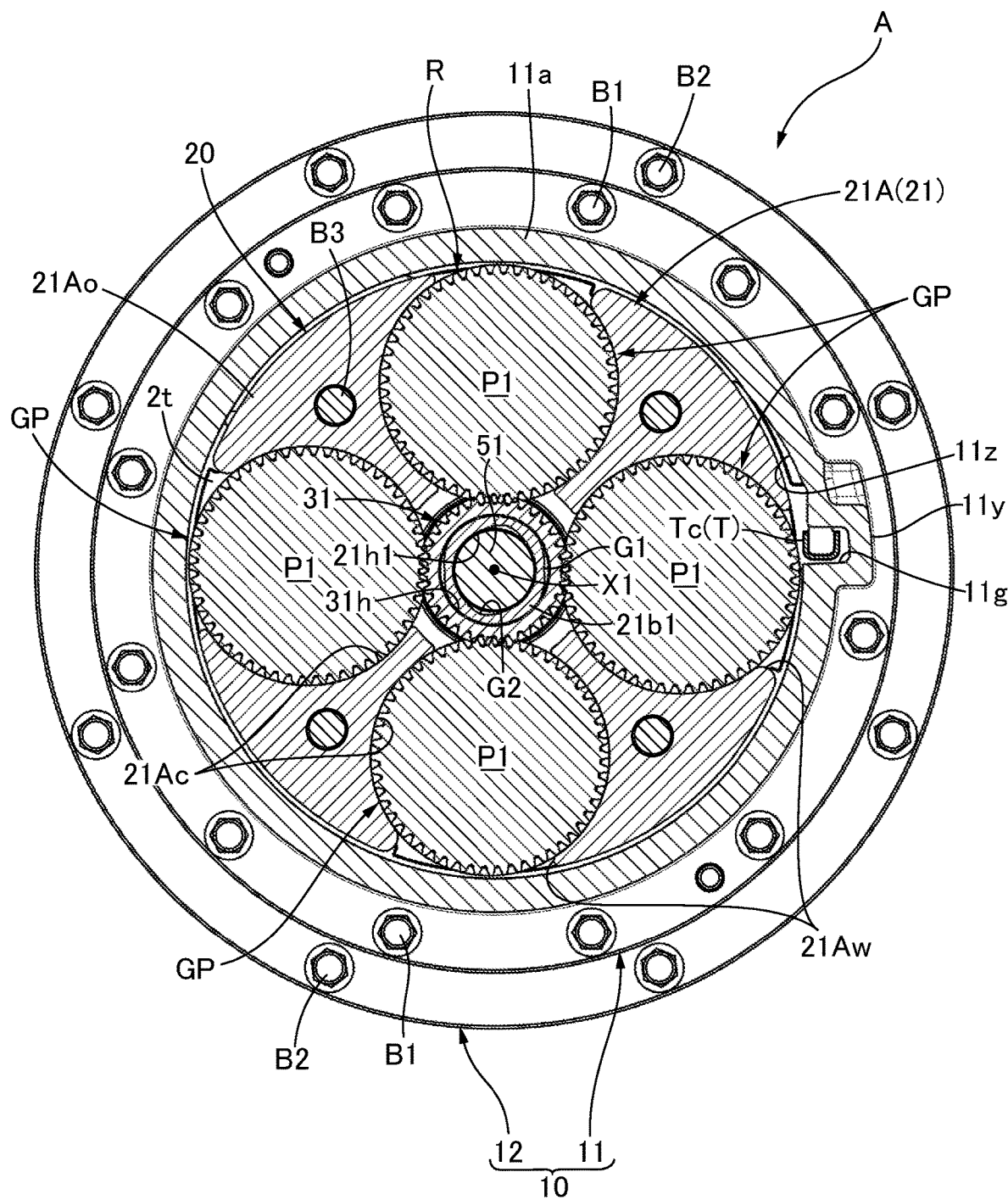
FIG. 3 is a sectional view along line 3-3 in FIG. 1. (first embodiment)

As is clearly shown in FIG. 3 and FIG. 9, a pump chamber-defining recess portion 21Ac is formed in one face (that is, the outside face of the first end wall 21A) of the mutually opposing faces, and the gear pump chamber 28 is thereby defined between the recess portion 21Ac and the other face (that is, the inside face of the first carrier portion C1) of the mutually opposing faces. In contrast to the present embodiment, a modified example in which a pump chamber-defining recess portion is formed in the other face of the mutually opposing faces (that is, the inside face of the first carrier portion C1) is also possible. It is also possible to implement a modified example in which the pump chamber-defining recess portion 21Ac is formed in, among the mutually opposing faces, both the outside face of the first end wall 21A and the inside face of the first carrier portion C1.

As is clearly shown in FIG. 3, the external diameter of the gear teeth of the first planetary gear portion P1 substantially coincides with the internal diameter of the gear pump chamber 28, that is, the gear teeth and the inner peripheral face of the gear pump chamber 28 are positioned so as to closely oppose each other in the radial direction. Mutually opposing faces of axially opposite side faces of the first planetary gear portion P1 and the axially opposite inside faces of the gear pump chamber 28 (that is, a bottom face of the recess portion 21Ac and an inside face of the first carrier portion C1) are positioned relatively closely in the axial direction.

Therefore, when the planetary gear P rotates, lubricating oil retained by a valley part of the gear teeth of the first planetary gear portion P1 is fed from the outer peripheral side of the power-transmission case 20 toward the center part side along the inner peripheral face of the gear pump chamber 28, and part thereof is also supplied to the first space part 25 between the extremity face of the sun gear 31 and the outside face of the first end wall 21A. The first planetary gear portion P1 and the gear pump chamber 28 thus form a gear pump GP that is in charge of the feed of lubricating oil.

While the planetary gear P is rotating, the lubricating oil retained by the valley part of the gear teeth of the first planetary gear portion P1 is pushed out from the valley part due to it meshing with the sun gear 31. In this process, as described above, the sun gear 31 and the first planetary gear portion P1 mesh with each other via the helical teeth, and the twist angle of the helical teeth is set so that lubricating oil is pushed out toward the first space part 25 side due to the two gears meshing with each other. More specifically, when the sun gear 31 and the first planetary gear portion P1 mesh with each other and rotate, the gear teeth of the first planetary gear portion P1 are set so as to mesh with the gear teeth of the sun gear 31 from the outer side in the axial direction and mesh with the gear teeth on the inner side in the axial direction due to further rotation. This enables lubricating oil that has been fed from the outer peripheral side of the power-transmission case 20 by means of the gear pump GP to efficiently reach the first space part 25.

With regard to the first carrier portion C1 and the first end wall 21A, parts of outer peripheral wall parts C1o, 21Ao thereof are positioned at a height where they are immersed in lubricating oil stored in a bottom part within the transmission case 10. The outer peripheral wall part C1o of the first carrier portion C1 of the present embodiment is provided at intervals in the peripheral direction with a plurality of splashing-up projecting portions 2t that can splash up lubricating oil stored within the transmission case 10. The outer peripheral wall parts C1o, 21Ao correspond to an outer peripheral portion having the maximum external diameter of the power-transmission case 20 and are one example of a specific outer peripheral wall part of the power-transmission case 20.

The outer peripheral wall part 21Ao of the first end wall 21A has a plurality of oil introduction windows 21Aw that expose part of the first planetary gear portion P1 from the outer peripheral face of the power-transmission case 20, and the oil introduction windows 21Aw are disposed so as to be adjacent to some of the splashing-up projecting portions 2t in the axial direction. Instead of or in addition to the structure of the illustrated example, the splashing-up projecting portion 2t may be placed at a position, adjacent to the oil introduction window 21Aw, of the outer peripheral wall part 21Ao of the first end wall 21A. As described above, in the case of a modified example in which a pump chamber-defining recess portion is formed in the inside face of the first carrier portion C1, an oil introduction window of the gear pump GP may be provided in the outer peripheral wall part C1o of the first carrier portion C1.

The differential device D includes the differential case 40, which is a body formed by joining the first and second end walls 21A, 21B and the linking wall 21L and receives rotational power from the reduction gear R (carrier C), and the differential gear mechanism 41, which is disposed within the differential case 40 and distributes the rotational power of the differential case 40 between the pair of output shafts 51, 52 while allowing differential rotation. The differential gear mechanism 41 is one example of a differential mechanism.

Figure 4:
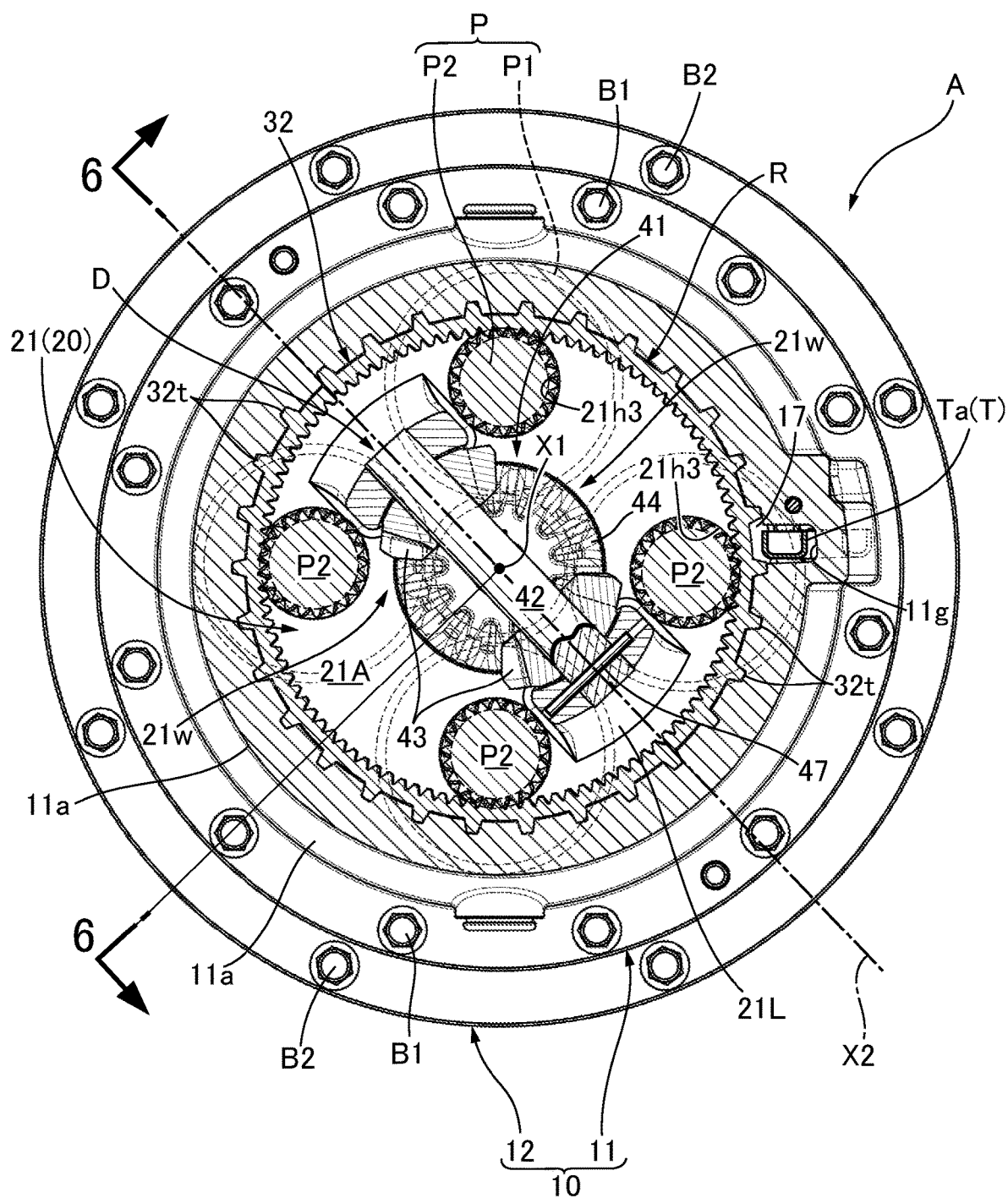
FIG. 4 is a sectional view along line 4-4 in FIG. 1. (first embodiment)
Figure 6:
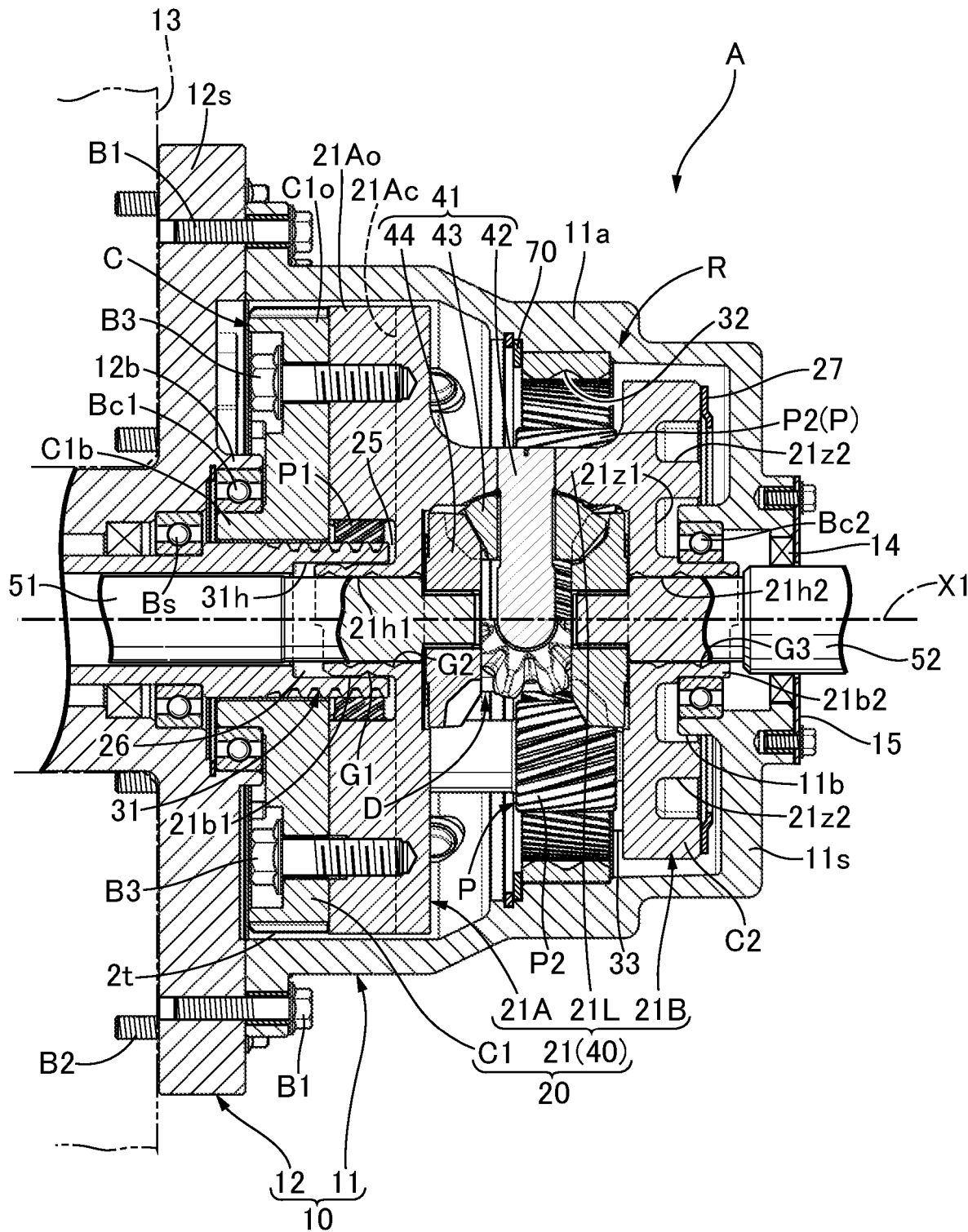
FIG. 6 is a sectional view along line 6-6 in FIG. 4. (first embodiment)

As is clear in FIG. 1, FIG. 4 and FIG. 6, the differential gear mechanism 41 includes a pinion shaft 42 that has opposite end parts fitted into and fixed (in the illustrated example, prevented from falling out by a press-fitted pin 47) to a pair of linking walls 21L of the power-transmission case main body 21 and is disposed on a second axis X2 orthogonal to the first axis X1, a plurality (two in the illustrated example) of pinion gears 43 rotatably supported on the pinion shaft 42, and left and right side gears 44 that mesh with each pinion gear 43 and can rotate around the first axis X1. The pinion gear 43 and the side gear 44 are one example of a differential mechanism-forming gear.

The pinion gear 43 and the side gear 44 are formed from bevel gears in the present embodiment. The two side gears 44 function as output gears of the differential gear mechanism 41, and inner end parts of the first and second output shafts 51, 52 are spline fitted into inner peripheral faces of the opposite side gears 44.

A spherical back face of each pinion gear 43 is supported on a spherical inner face of the linking wall 21L via a washer so that it can rotate around the second axis X2, and a flat back face of each side gear 44 is supported on mutually opposing faces of the first and second end walls 21A, 21B via a washer so that it can rotate around the first axis X1. The washer may be omitted as necessary.

The rotational force transmitted from the carrier C to the power-transmission case main body 21 (and consequently the differential case 40) is distributed between the first and second output shafts 51, 52 by the differential gear mechanism 41 while allowing differential rotation. Since the differential function of the differential gear mechanism 41 is conventionally known, explanation thereof is omitted.

The power-transmission case main body 21 includes a working window 21w between the first and second end walls 21A, 21B, the working window 21w allowing the pinion gear 43 and the side gear 44 to be assembled into the interior of the differential case 40. This working window 21w is defined between edges of two peripherally adjacent linking walls 21L that adjoin each other in the peripheral direction and extend linearly along the rotational axis X1.

The assembly operation is carried out for example as follows. First, in a state in which the pair of side gears 44 are assembled in the differential case 40 through the working window 21w, the pinion gear 43 is inserted through the working window 21w to a position where it is meshed with the side gear 44. Subsequently, while maintaining the meshed state, the gear back face is made to abut against the pinion gear support face of the linking wall 21L by revolving the pinion gear 43 around the side gear 44. In the abutted state, the pinion shaft 42 is made to extend through the pinion gear 43 and the linking wall 21L, and the pinion shaft 42 is fixed to the linking wall 21L by means of the press fitting pin 47.

The working window 21w has a size (more specifically the width of the opening in the axial and peripheral directions) that allows the entire width in the axial direction of the locus of rotation of at least the meshed portion (in the present embodiment the entire tooth face) of tooth faces of all of differential mechanism-forming gears forming the differential gear mechanism 41 (that is, the pinion gear 43 and the side gear 44) to be exposed to the outside of the power-transmission case 20.

Moreover, as is also clear from FIG. 4, the opening face of the working window 21w of the present embodiment is formed into a shape that makes the locus of rotation protrude further outside than the opening face. In other words, the opening face of the working window 21w is positioned on a virtual plane that joins peripherally adjacent edges of two peripherally adjacent linking walls 21L to each other and that is orthogonal to the plane of the paper of FIG. 4, and it is clear from the positional relationship that the locus of rotation protrudes further outside than the opening face.

The second planetary gear portion P2 and all of the differential mechanism-forming gears 43, 44 are disposed in the power-transmission case 20 so that at least parts thereof oppose each other via the opening of the working window 21w and overlap one another in the axial direction.

This enables lubricating oil that is scattered from the second planetary gear portion P2 while the reduction gear R is operating to be supplied directly to at least the meshed portion (in the present embodiment the entire tooth face) of the tooth faces of all of the differential mechanism-forming gears (that is, the pinion gears 43 and the side gears 44) within the differential case 40, and conversely, since lubricating oil that is scattered from the tooth faces of the differential mechanism-forming gears 43, 44 can be supplied directly to the second planetary gear portion P2, the effect of lubricating the differential device D and the reduction gear R is enhanced with a simple structure. In this case, in the present embodiment in particular, since the working window 21w allows the meshed portion to be exposed to the outside of the power-transmission case 20 over the entire width in the axial direction of the locus of rotation, it becomes easy to supply lubricating oil that has been scattered within the power-transmission case 20 to the meshed portion, thus further enhancing the lubricating effect. Moreover, since the opening face of the working window 21w is formed into a shape that makes the locus of rotation of the meshed portion protrude further outside than the opening face, the locus of rotation (and consequently the meshed portion) can be made closer to the second planetary gear portion P2, as a result lubricating oil scattered from the second planetary gear portion P2 can be supplied to the meshed portion more efficiently, and conversely since lubricating oil scattered from the differential mechanism-forming gears 43, 44 can be supplied to the second planetary gear portion P2 more efficiently, the lubricating effect is further enhanced.

Due to the second planetary gear portion P2 and the differential gear mechanism 41 being disposed in the power-transmission case 20 so as to overlap one another in the axial direction, it becomes possible to reduce the axial dimension of the power-transmission case 20 only by a length corresponding to the mutual overlap in the axial direction of the second planetary gear portion P2 and the differential gear mechanism 41.

The entirety of the power-transmission case main body 21 of the power-transmission case 20 is molded by casting as a unit. The power-transmission case main body 21 includes first and second output shaft insertion holes 21h1, 21h2 into which the first and second output shafts 51, 52 respectively can be inserted via opposite outer sides in the axial direction, and first and second planetary gear insertion holes 21h3, 21h4 into which the planetary gear P can be inserted via a face opposing the first carrier portion C1 in the axial direction.

The first and second output shaft insertion holes 21h1, 21h2 correspond to the center holes of the first and second bearing boss portions 21b1, 21b2, and the first planetary gear insertion hole 21h3 is formed so as to extend through the first end wall 21A with an internal diameter that allows the second planetary gear portion P2 to pass through. Furthermore, the second planetary gear insertion hole is formed from the bearing hole 21h4 provided in the second end wall 21B.

In the transmission device A of the present embodiment, the first planetary gear portion P1 of the planetary gear P is disposed on one side (the left side in FIG. 1) of the differential gear mechanism 41 in the axial direction, and the second case support bearing Bc2 as a specific case support bearing is disposed on the other side (on the right side in FIG. 1) of the differential gear mechanism 41. That is, the first planetary gear portion P1 and the second case support bearing Bc2 are present at positions distant from each other with the differential gear mechanism 41 sandwiched therebetween in the axial direction, and the second case support bearing Bc2 in particular is present at a position where it is difficult for a sufficient amount of lubricating oil scattered from the reduction gear R and the differential device D within the transmission case 10 to reach. The ring gear 32 is fitted on the inner peripheral face of the transmission case main body 11 between the second case support bearing Bc2 and the first planetary gear portion P1, and this might become a wall preventing lubricating oil from being scattered.

On the other hand, the outer peripheral wall parts C1$o$, 21A$o$ of the first carrier portion C1 and the first end wall 21A are maximum external diameter portions of the power-transmission case 20, that is, specific outer peripheral wall parts, and can splash up a large amount of lubricating oil stored in the bottom part within the transmission case 10 accompanying rotation of the power-transmission case 20.

Figure 7:
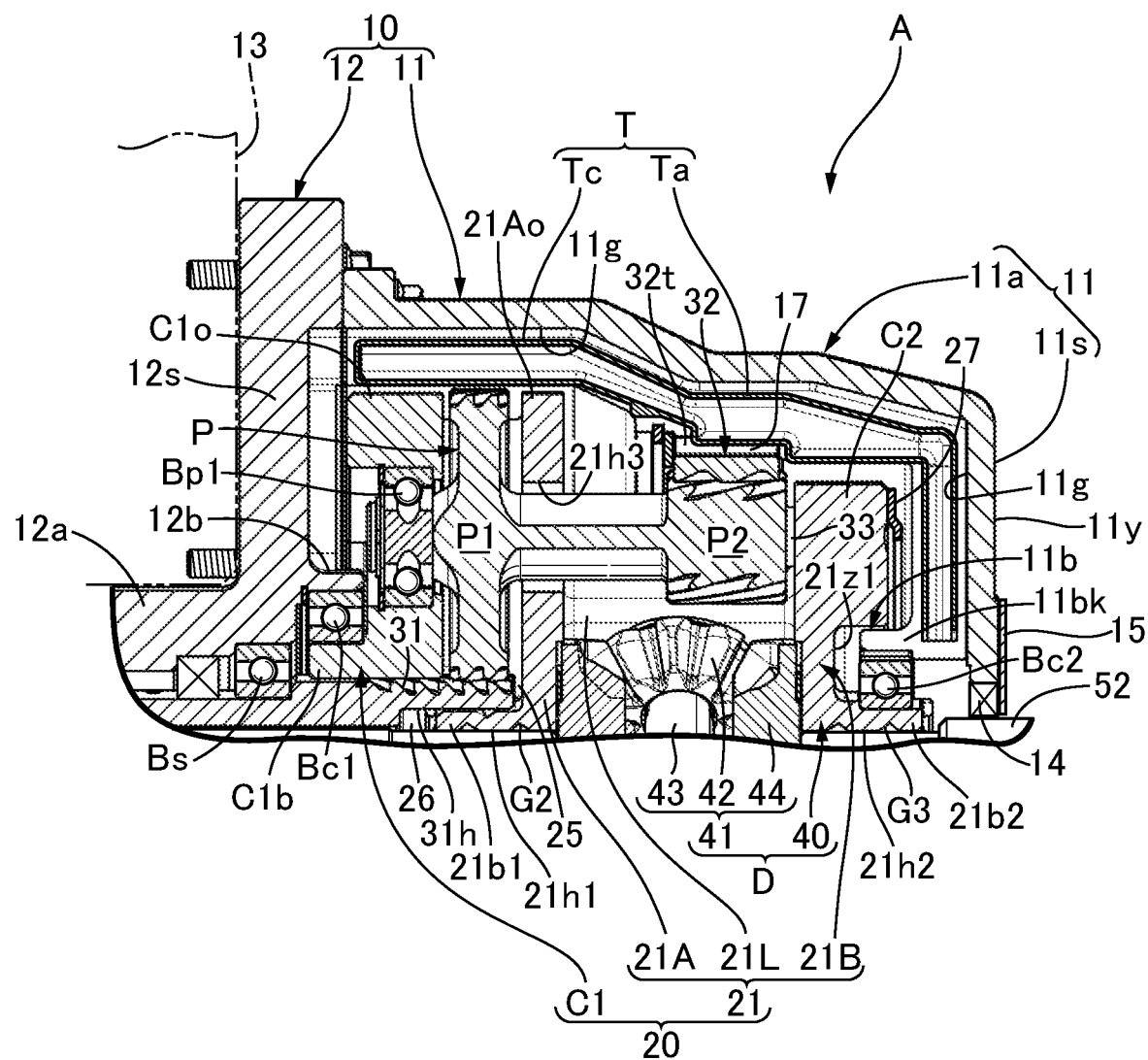
FIG. 7 is a plan sectional view (a sectional view along line 7-7 in FIG. 2) showing a mode in which an oil passage-forming body is mounted on a transmission case. (first embodiment)
Figure 10:
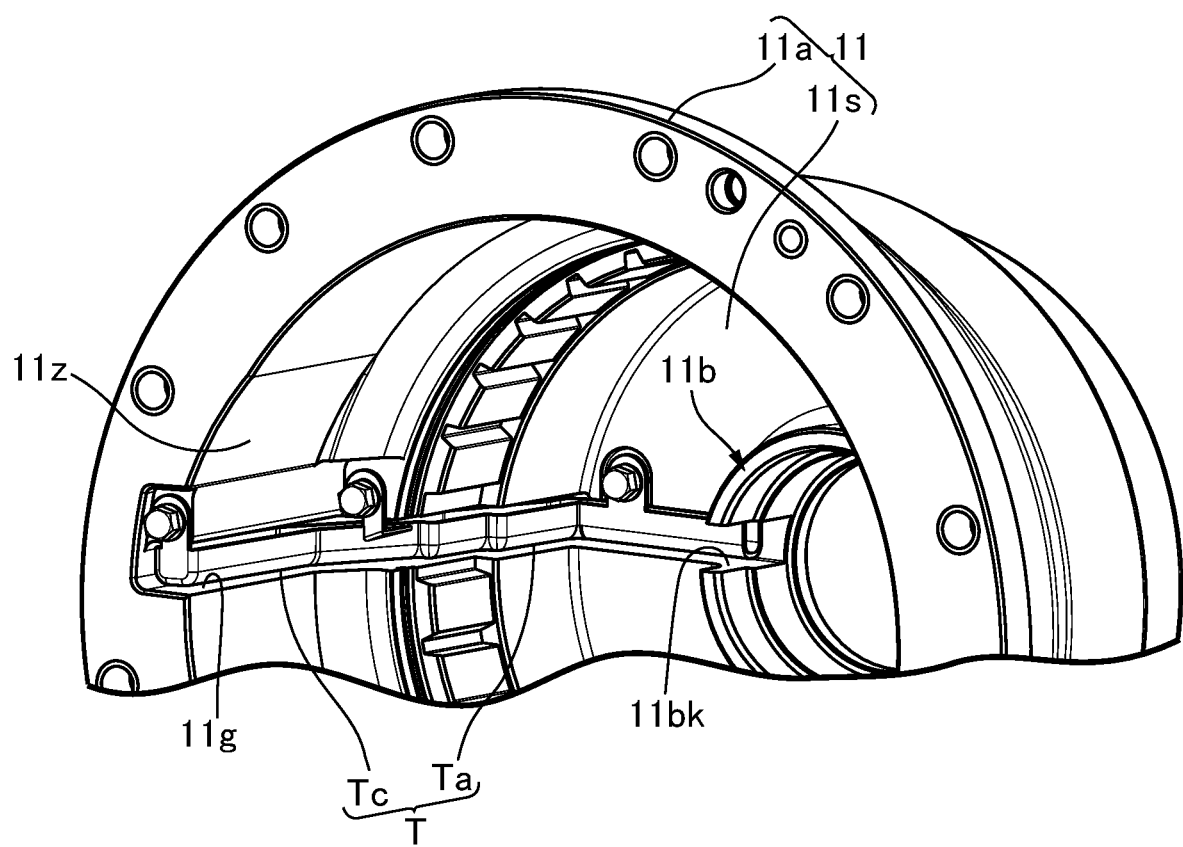
FIG. 10 is a perspective view showing a mode in which the oil passage-forming body is mounted on a main body of the transmission case. (first embodiment)
Figure 11:
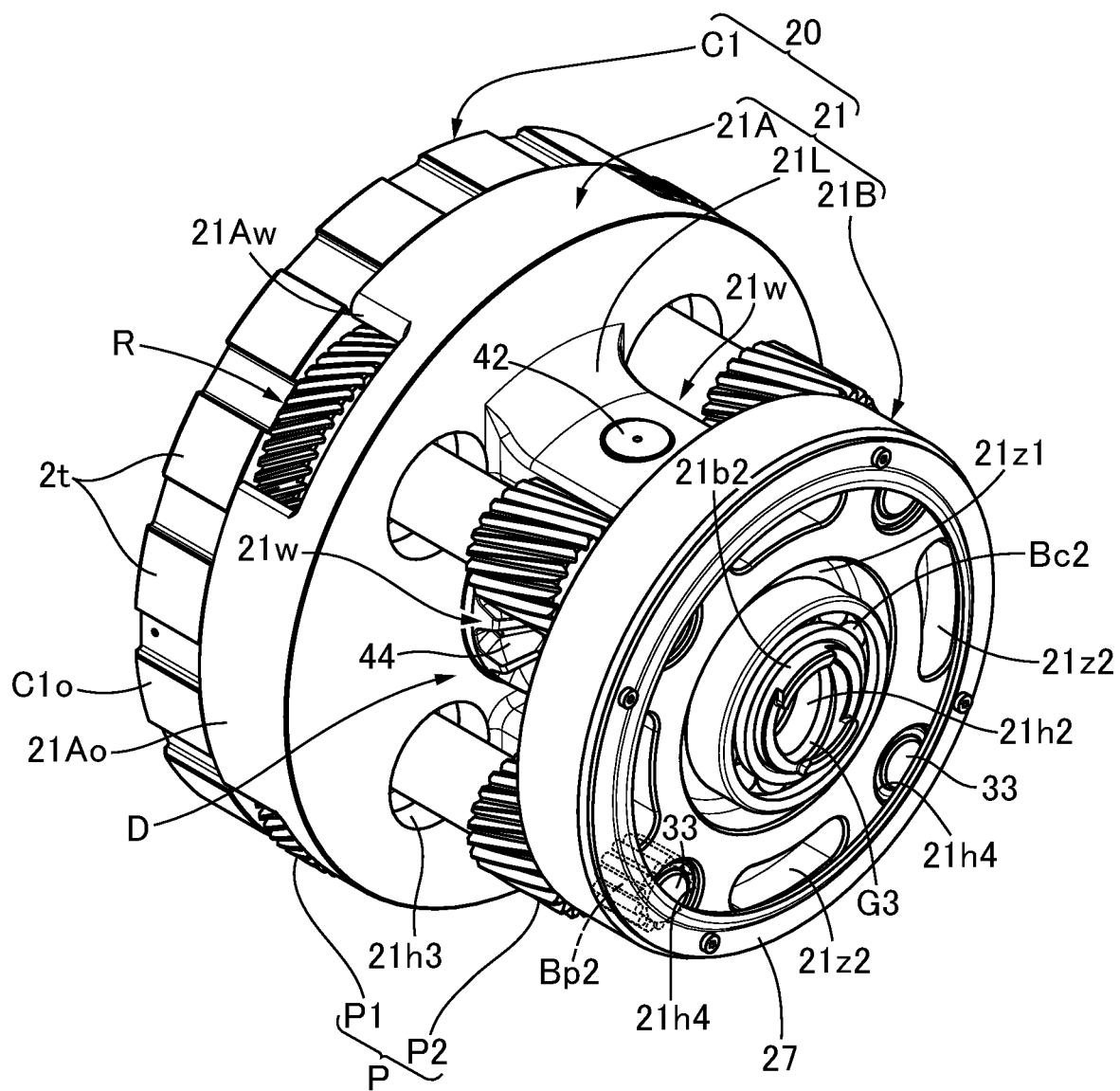
FIG. 11 is a perspective view of an essential part of the transmission device with the transmission case omitted. (first embodiment)

In the present embodiment, an oil supply structure for efficiently supplying part of lubricating oil splashed by the specific outer peripheral wall parts C1$o$, 21A$o$ is added to the second case support bearing Bc2 side. One example of the oil supply structure is now specifically explained by reference in addition to FIG. 7, FIG. 8 and FIG. 10.

That is, mounted on the inner wall of the transmission case main body 11 is an oil passage-forming body T that includes an upwardly opening oil collection part Tc that can collect the lubricating oil splashed up within the transmission case 10 by means of the first planetary gear portion P1 and/or the specific outer peripheral wall parts C1$o$, 21A$o$, and an oil reservoir part Ta that communicates with the oil collection part Tc, stores lubricating oil collected by the oil collection part Tc, and supplies it to the second case support bearing Bc2.

The oil collection part Tc is disposed in an intermediate part in the peripheral direction of a semicircular part (that is, a right semicircular part in FIG. 3) of the transmission case main body 11 on one side (right-hand side in FIG. 3) of a vertical line passing through the rotational axis X1 when viewed on a projection plane orthogonal to the rotational axis X1 of the power-transmission case 20. The semicircular part corresponds to a semicircular part on the side where the outer peripheral part of the power-transmission case 20 at the time of forward rotation moves in the peripheral direction from an apex part of the transmission case main body 11 toward a bottom part; the intermediate part in the peripheral direction is not limited to a position having a central angle of 90 degrees from the apex part of the transmission case main body 11 as in the illustrated example, and may be a position having such a central angle that is somewhat smaller or larger than 90 degrees.

The oil passage-forming body T is formed from a gutter-shaped member having an open upper face, is disposed so as to extend through the interior of a mounting groove 11$g$ that is continuously recessed in the inner face of the transmission case main body 11 (more specifically, the barrel portion 11$a$ and the end wall portion 11$s$), and is fixed to the transmission case main body 11 (for example, secured by a plurality of screws as in the illustrated example). A bulge portion 11$y$ for ensuring a thickness for the groove peripheral wall portion is formed integrally with the outer face of the transmission case main body 11 at a position corresponding to the mounting groove 11$g$.

This oil passage-forming body T is given an inclination such that it lowers slightly in going from the upstream end (more specifically, the upstream end of the oil collection part Tc) toward the downstream end (more specifically, the downstream end of the oil reservoir part Ta). Because of this, lubricating oil collected by the oil collection part Tc flows very gently down on the oil collection part Tc and the oil reservoir part Ta and is supplied to the second case support bearing Bc2, which faces the downstream end. The oil passage-forming body T is formed lengthwise in the axial direction due to it extending from the first planetary gear portion P1, which is located on one side in the axial direction of the differential mechanism 41, up to the second case support bearing Bc2, which is located on the other side in the axial direction of the differential mechanism 41.

As is clearly shown in FIG. 3 and FIG. 8, a cutout-shaped recess portion 11$z$ is formed in the inner peripheral face of the transmission case main body 11 so that the axial position thereof is made to coincide with at least part of (the entirety in the illustrated example) of the oil collection part Tc, the cutout-shaped recess portion 11$z$ guiding, to the upper opening of the oil collection part Tc, lubricating oil that has fallen down along the inner peripheral face of the transmission case main body 11 at a position higher than the mounting groove 11$g$.

The oil reservoir part Ta is disposed so that a midway portion thereof extends through a space 17 between the ring gear 32 and the transmission case main body 11 in the radial direction as is clear in FIG. 4. More specifically speaking, the oil reservoir part Ta is disposed so as to extend through the space 17 facing an outer peripheral face of the ring gear 32 between two peripherally adjacent rotation-preventing projection portions 32$t$ on the outer peripheral side of the ring gear 32.

The second case support bearing Bc2 is disposed as described above between the second bearing boss portion 21$b$2 of the second end wall 21B and the second support boss portion 11$b$ of the end wall portion 11$s$ of the transmission case main body 11. The second support boss portion 11$b$ is one example of a power-transmission case support part and has the second output shaft 52 extending through the interior thereof in the axial direction. The end wall portion 11$s$ has a cutout portion 11$bk$ providing communication between an outer peripheral part and an inner peripheral part of the second support boss portion 11$b$, and the cutout portion 11$bk$ communicates directly with an inner end part in the radial direction of the mounting groove 11$g$ in the inner face of the end wall portion 11$s$.

The oil passage-forming body T (more specifically, the oil reservoir part Ta) thus has its downstream end reaching the cutout portion 11$bk$. It is thereby possible to directly supply lubricating oil that has flowed down the oil passage-forming body T not only to the second case support bearing Bc2 but also to the part where the second output shaft 52 is fitted to the second bearing boss portion 21$b$2.

In this way, even if the part where the second output shaft 52 is fitted to the second bearing boss portion 21$b$2 is separated from the internal space of the transmission case 10 by means of the second case support bearing Bc2, since lubricating oil can be supplied from the oil passage-forming body T to the radially inner side of the second support boss portion 11$b$ through the cutout portion 11$bk$, it becomes possible to directly and sufficiently lubricate the fitted part with lubricating oil supplied from the oil passage-forming body T.

The operation of the embodiment is now explained.

In the transmission device A, when the sun gear 31 is rotated by a power source (for example, an electric motor), which is not illustrated, the sun gear 31 and ring gear 32 and the first and second planetary gear portions P1, P2 of the two-stage planetary gear P are meshed with each other to thus transmit the rotational force of the sun gear 31 to the carrier C while reducing the speed in two stages. The rotational force transmitted to the power-transmission case 20, which is integral with the carrier C, is distributed between the first and second output shafts 51, 52 by means of the differential gear mechanism 41 within the differential case 40, which is part of the power-transmission case 20, while allowing differential rotation, and is further transmitted from the first and second output shafts 51, 52 to the left and right driven wheels.

In such a transmission device A, the carrier C of the reduction gear R is dividedly formed from the first carrier portion C1, which supports one end part, close to the first planetary gear portion P1, of the pivot shaft 33 of the two-stage planetary gear P, and the second carrier portion C2, which supports the other end part, close to the second planetary gear portion P2, of the pivot shaft 33, and the power-transmission case 20 is dividedly formed from the power-transmission case main body 21, which integrally has the differential case 40 and the second carrier portion C2, and the first carrier portion C1, which is joined and fixed to the first end wall 21A of the power-transmission case main body 21. The first planetary gear portion P1 is disposed between opposing faces of the first end wall 21A and the first carrier portion C1, and the power-transmission case main body 21 has the plurality of first and second planetary gear insertion holes 21h3, 21h4, into which the planetary gear P can be inserted from the opposing face sides in the axial direction, the first and second output shaft insertion holes 21h1, 21h2, into which the first and second output shafts 51, 52 can be inserted from outer sides in the axial direction, and the working window 21w, which allows the differential mechanism-forming gears (that is, the pinion gear 43 and the side gear 44) to be assembled into the differential case 40.

After the planetary gear P is inserted into the power-transmission case main body 21 from the opposing face side, joining and fixing the first end wall 21A and the first carrier portion C1 to each other by means of the bolt B3 so as to sandwich the first planetary gear portion P1 therebetween enable the planetary gear P to be easily assembled onto the power-transmission case 20, and it is unnecessary to specially form a working window exclusively used for assembling the planetary gear P in a carrier-forming portion of the power-transmission case 20. In this case, the only core that is necessary in a casting step for the power-transmission case main body 21 is a core that continuously molds the inner face of the differential case 40 and the working window 21w for assembling the differential gear mechanism, which is continuous from the inner face of the differential case 40, and there is the advantage that the overall casting step can be simplified and the casting cost can be reduced.

On the other hand, as described in Patent Document 1 above, in a transmission case structure in which a large carrier (22) supporting a two-stage planetary gear is integrated with a differential case (38), it is necessary to form a plurality of large planetary gear insertion working windows in a peripheral wall part of the carrier (22) in order to assemble a plurality of planetary gears (30) onto the carrier (22). Therefore, in the process of casting the transmission case, it is necessary to separately prepare a plurality of cores for molding these planetary gear insertion working windows and a core for molding an inner face of the differential case, and there is therefore the disadvantage that the total number of cores used in the casting step increases, the step becomes complicated, and the cost increases.

The power-transmission case main body 21 of the present embodiment includes the first end wall 21A, into which is fitted and which supports the first output shaft 51, the second end wall 21B, which opposes the first end wall 21A across a gap in the axial direction and into which is fitted and which supports the second output shaft 52, and the plurality of linking walls 21L, which are present, in the peripheral direction, at positions different from the pivot shaft 33 and the second planetary gear portion P2 of the planetary gear P and integrally join the first and second end walls 21A, 21B, the working window 21w being defined between adjacent edges in the peripheral direction of two linking walls 21L that are adjacent in the peripheral direction.

This enables the working window 21w to be easily formed between the adjacent linking walls 21L with a simple structure in which the opposite end walls 21A, 21B of the power-transmission case main body 21 are joined and integrated by means of the plurality of linking walls 21L. Moreover, since the linking wall 21L is present, in the peripheral direction, at a position different from the pivot shaft 33 and the second planetary gear portion P2 of the two-stage planetary gear P, which are positioned so as to overlap the linking wall 21L in the axial direction, it is unnecessary to form and dispose the linking wall 21L outside in the radial direction so as to bypass the pivot shaft 33 and the second planetary gear portion P2, and the dimension in the radial direction of the power-transmission case main body 21 can be reduced accordingly.

Furthermore, in the power-transmission case 20 of the present embodiment, the gear pump GP is formed from the first planetary gear portion P1 of the planetary gear P and the gear pump chamber 28 defined between the opposing faces of the power-transmission case main body 21 (more specifically, the first end wall 21A) and the first carrier portion C1. It thereby becomes possible to forcibly feed lubricating oil from the outer peripheral side of the power-transmission case 20 to the center part side (for example, to the first space part 25) with a simple gear pump structure utilizing the planetary gear P, and it is therefore unnecessary to provide the power-transmission case 20 with a lubricating oil pump exclusively used therefor, thus simplifying the structure of the transmission device A and consequently giving a saving in cost.

The sun gear 31 and the first planetary gear portion P1 mesh with each other via helical teeth, and the twist angle of the helical teeth is set so that due to the two gears meshing with each other lubricating oil within the valley part of the gear teeth of the first planetary gear portion P1 is pushed out toward the first space part 25 side. This enables the lubricating oil fed out by the gear pump GP to efficiently reach the first space part 25.

Moreover, since the planetary gear P is a two-stage planetary gear integrally having the large-diameter first planetary gear portion P1, which meshes with the sun gear 31, and the small-diameter second planetary gear portion P2, which meshes with the ring gear 32, and in particular the large-diameter first planetary gear portion P1 becomes the gear portion of the gear pump GP, the pumping efficiency of the gear pump GP is enhanced with a simple structure utilizing the large-diameter first planetary gear portion P1.

Moreover, the plurality of splashing-up projecting portions 2t, which can splash up lubricating oil stored in the bottom part of the transmission case 10, are provided integrally with the outer peripheral wall part C1o of the first carrier portion C1, the oil introduction window 21Aw, which exposes part of the first planetary gear portion P1 to the outside of the power-transmission case 20, is opened in the outer peripheral wall part 21Ao of the first end wall 21A, which has substantially the same diameter as that of the first carrier portion C1, and the oil introduction window 21Aw is disposed so as to be adjacent to some of the splashing-up projecting portions 2t in the axial direction. It is thereby possible to efficiently supply part of the lubricating oil toward the oil introduction window 21Aw side as a result of the splashing-up projecting portions 2t splashing up the oil stored in the transmission case 10 in response to rotation of the power-transmission case 20, thus further enhancing the pumping efficiency of the gear pump GP.

In the reduction gear R of the present embodiment, since the ring gear 32 is fixed to the transmission case 10 while the rotational force from the power source is inputted into the sun gear 31, the first planetary gear portion P1 rotates in a direction opposite to the rotational direction of the power-transmission case 20 accompanying input of the rotational force. In this process, since the lubricating oil that has been scooped up by means of rotation of the power-transmission case 20 tries to fall in the direction of gravity, it becomes easy to draw the lubricating oil into the power-transmission case 20 by means of the first planetary gear portion P1 rotating in the opposite direction to that of the power-transmission case 20. The pumping efficiency of the gear pump GP is thereby further enhanced.

Furthermore, in the transmission device A of the present embodiment, the power-transmission case 20 rotatably supported on the transmission case 10 is dividedly formed from the power-transmission case main body 21, which is formed by integrating the differential case 40 and the second carrier portion C2, and the first carrier portion C1, which is joined to the outside face of the first end wall 21A of the power-transmission case main body 21, the first bearing boss portion 21b1, into which is fitted and which supports the outer peripheral part of the first output shaft 51, is projectingly provided on the side face, on the sun gear 31 side, of the first end wall 21A, the first bearing boss portion 21b1 is present at a position where it overlaps the sun gear 31 in the axial direction, and the outer peripheral part of the first bearing boss portion 21b1 is fitted into the center hole 31h of the sun gear 31.

This not only enables the first bearing boss portion 21b1, which is long in the axial direction and into which is fitted and which supports the first output shaft 51, to be easily machined on the split face of the power-transmission case 20, in particular on an outside face of the first end wall 21A that can be widely exposed to the outside, but also enables the first output shaft 51 to be stably fitted into and supported by the long first bearing boss portion 21b1. Moreover, since the first bearing boss portion 21b1 can also function as means for supporting the sun gear 31 due to it being fitted into the center hole 31h of the sun gear 31, the rigidity with which the sun gear 31 is supported can be enhanced with a simple structure. Furthermore, due to the first bearing boss portion 21b1 overlapping the sun gear 31 in the axial direction, the increase in the axial dimension of the power-transmission case 20 accompanying the first bearing boss portion 21b1 being projectingly provided is suppressed, and it is therefore advantageous in terms of reducing the axial dimension of the transmission device A.

Further, the first space part 25, into which can flow part of lubricating oil flowing from the outer peripheral side toward the center part side within the power-transmission case 20 accompanying operation of the reduction gear R, is present between the extremity face of the sun gear 31 and the first end wall 21A of the transmission case main body, and lubricating oil is also forcibly fed into the first space part 25 by means of the gear pump GP. This enables lubricating oil to be efficiently supplied toward the part where the sun gear 31 is fitted to the first bearing boss portion 21b1 via the first space part 25, thus enabling the fitted part to be lubricated without problems.

Furthermore, the oil passage G1, which has one end thereof communicating with the first space part 25, is provided between the mating faces of the sun gear 31 and the first bearing boss portion 21b1, and the other end of the oil passage G1 opens in the second space part 26, which faces the part where the center hole 31h of the sun gear 31 is fitted onto the outer periphery of the first output shaft 51 on the outer side in the axial direction of the first bearing boss portion 21b1. Because of this, even if the outer periphery of the first bearing boss portion 21b1 is fitted to the sun gear 31 and the first output shaft 51 is not exposed within the transmission case 10 or the power-transmission case 20, the lubricating oil flowing to the first space part 25 (including the oil fed from the gear pump GP) as described above can be sufficiently supplied to the part where the first output shaft 51 is fitted to the first bearing boss portion 21b1 through the oil passage G1 and the second space part 26, and the fitted part can be lubricated without problems.

In the transmission device A of the present embodiment, the first planetary gear portion P1 of the planetary gear P is disposed on one side (the left side in FIG. 1) of the differential gear mechanism 41 in the axial direction, and the second case support bearing Bc2 is disposed on the other side (the right side in FIG. 1) of the differential gear mechanism 41. Moreover, the oil passage-forming body T is provided on the inner wall of the transmission case main body 11. The oil passage-forming body T forms the oil collection part Tc, which opens upward and can collect lubricating oil splashed up by the first planetary gear portion P1 and/or the specific outer peripheral wall part of the power-transmission case 20 (more specifically, the outer peripheral wall parts C1o, 21Ao of the first carrier portion C1 and the first end wall 21A) within the transmission case 10, and the oil reservoir part Ta, which is continuous from the oil collection part Tc, stores the lubricating oil collected thereby, and supplies it to the second case support bearing Bc2.

This enables the lubricating oil splashed up by the first planetary gear portion P1 and/or the specific outer peripheral wall parts C1o, 21Ao to be collected by the oil collection part Tc even if the first planetary gear portion P1 and the second case support bearing Bc2 are disposed at positions distant from each other in the axial direction with the differential gear mechanism 41 sandwiched therebetween, and to be made to gently and continuously flow and be supplied via the oil reservoir part Ta to the second case support bearing Bc2, which is disposed distant from the oil collection part Tc in the axial direction, and it is therefore possible to sufficiently lubricate the second case support bearing Bc2. Moreover, the oil passage-forming body T, which is long in the axial direction due to it extending from the first planetary gear portion P1 on one side in the axial direction of the differential mechanism 41 up to the second case support bearing Bc2 on the other side in the axial direction of the differential mechanism 41, can exhibit an auxiliary tank function of temporarily storing a relatively large amount of lubricating oil while the transmission device A is transmitting power, and it is therefore possible to set a rather low level for the oil stored within the transmission case 10 during transmission by a portion corresponding to the temporarily stored lubricating oil. This enables the resistance to stirring of the lubricating oil by the power-transmission case 20 to be decreased, thereby suppressing any degradation in the transmission efficiency caused by the stored oil being splashed up.

Furthermore, since the first planetary gear portion P1 is the large-diameter side planetary gear portion of the two-stage planetary gear P and the specific outer peripheral wall parts C1o, 21Ao positioned in the area around the first planetary gear portion P1 are the maximum external diameter parts of the power-transmission case 20, it becomes possible to vigorously splash up lubricating oil stored in the bottom part of the transmission case 10 by means of the large-diameter first planetary gear portion P1 and/or the specific outer peripheral wall parts C1o, 21Ao, thus enhancing the oil collecting effect of the oil collection part Tc.

The oil collection part Tc is disposed on an intermediate part in the peripheral direction of the semicircular part of the transmission case main body 11 on one side (the right side in FIG. 3) of the vertical line passing through the rotational axis X1 when viewed on a projection plane orthogonal to the rotational axis X1 of the power-transmission case 20, and the semicircular part on the one side is a semicircular part on the side on which the outer peripheral part of the power-transmission case 20 rotating forward (that is, at the time of forward movement of the vehicle) moves in the peripheral direction from the apex part to the bottom part of the transmission case main body 11. This enables the lubricating oil scattered from the first planetary gear portion P1 and/or the specific outer peripheral wall parts C1o, 21Ao of the power-transmission case 20 rotating forward and flowing downward along the inner periphery of the transmission case main body 11 to be efficiently collected by the oil collection part Tc.

The oil passage-forming body T is formed from a gutter-shaped member that is fixed (for example, secured by a screw) to the transmission case main body 11 so as to extend through the interior of the mounting groove 11g recessed in the inner periphery of the transmission case main body 11. The cutout-shaped recess portion 11z (see FIG. 3 and FIG. 8), which guides, to the upper opening of the oil collection part Tc, the lubricating oil running down along the inner peripheral face of the transmission case main body 11 above the mounting groove 11g, is formed in the inner periphery of the transmission case main body 11 so that the axial position of the cutout-shaped recess portion 11z is made to coincide with that of at least part (in the illustrated example, substantially the entirety) of the oil collection part Tc. It is thereby possible to further efficiently collect with the oil collection part Tc lubricating oil that has scattered from the first planetary gear portion P1 and/or the specific outer peripheral wall parts C1o, 21Ao of the power-transmission case 20 rotating forward and has flowed downward along the inner periphery of the transmission case main body 11.

Moreover, as is clearly shown in FIG. 4, since the oil reservoir part Ta and the mounting groove 11g are disposed so that midway portions thereof pass through the space 17 between the ring gear 32 and the transmission case main body 11 in the radial direction, even when the first planetary gear portion P1 and the second case support bearing Bc2 are separated in the axial direction on the inner face of the transmission case main body 11 by means of the ring gear 32, it is possible to supply lubricating oil beyond the ring gear 32 without problems.

The plurality of rotation-preventing projection portions 32t arranged at intervals in the peripheral direction are projectingly provided in particular on the outer peripheral face of the ring gear 32 fitted into and fixed to the inner periphery of the transmission case main body 11 of the present embodiment, and the oil reservoir part Ta is disposed so as to extend through the space 17 facing the outer periphery of the ring gear 32 between the two rotation-preventing projection portions 32t, which are adjacent in the peripheral direction, on the outer peripheral side of the ring gear 32. This enables the oil reservoir part Ta to be laid out easily by utilizing a space on the outer peripheral side of the ring gear 32 between the two rotation-preventing projection portions 32t.

As described above, since the plurality of lubricating oil splashing-up projecting portions 2t are projectingly provided on at least one of the specific outer peripheral wall parts C1o, 21Ao of the power-transmission case 20, it is possible for the splashing-up projecting portions 2t to efficiently splash up lubricating oil stored in the bottom part of the transmission case main body 11, thus further enhancing the oil collecting effect of the oil collection part Tc.

In the transmission device A of the present embodiment, the pivot shaft 33 of the two-stage planetary gear P in the reduction gear R has one end part on the large-diameter first planetary gear portion P1 side supported on the first carrier portion C1 via the first bearing Bp1 and the other end part on the small-diameter second planetary gear portion P2 side supported on the second carrier portion C2 via the second bearing Bp2. Among the first and second bearings Bp1, Bp2, a bearing (for example, a ball bearing) supporting a thrust load on one side and the other side in the axial direction is selected only for the first bearing Bp1 in particular, whereas a bearing (for example, a needle bearing) that does not support a thrust load is selected for the second bearing Bp2.

In this way, since the second bearing Bp2 is not subjected to a thrust load, the radial dimension of the second bearing Bp2 (and consequently the bearing face 21h4) can be reduced, and consequently the radial dimension of the wall portion, around the second bearing Bp2, of the second end wall 21B including the second carrier portion C2 can be reduced. As a result, even when the power-transmission case 20 is provided with both the differential device D and the planetary gear type reduction gear R including the two-stage planetary gear P, the radial dimension of the wall portion of the second end wall 21B in particular can be reduced effectively. Moreover, since the second planetary gear portion P2 adjacent to the second bearing Bp2 has a relatively small diameter, the radial dimension of a peripheral wall part, surrounding the wall portion and the second planetary gear portion P2, of the transmission case main body 11 can be reduced.

Furthermore, the second end wall 21B, which has the second carrier portion C2 integrated therewith, of the power-transmission case 20 of the present embodiment includes the plurality of bearing faces 21h4 (pivot shaft support parts), which are formed so as to extend through the second end wall 21B and support the other end part of the pivot shaft 33 via the second bearing Bp2, the circular recessed place 21z1, which is recessed in the outside face of the second end wall 21B further radially inside than the second bearing Bp2 and has its bottom face positioned further inside in the axial direction than the outer end in the axial direction of the bearing face 21h4, and the second bearing boss portion 21b2, which protrudes outward in the axial direction from the bottom face of the recessed place 21z1 and is rotatably fitted onto and supports the second output shaft 52. The outer peripheral part of the second bearing boss portion 21b2 is supported via the second case support bearing Bc2 on the second support boss portion 11*b* projectingly provided on the inner face of the transmission case main body 11, and at least part of each of the second case support bearing Bc2 and the second support boss portion 11*b* is disposed within the recessed place 21*z*1.

Because of this, due to the second bearing Bp2, which does not receive a thrust load, being narrow in the radial direction and wide in the axial direction, it becomes possible to form, in the outside face of the second end wall 21B supporting the second bearing Bp2, the recessed place 21*z*1, which has a large diameter and is deep in the axial direction, further radially inside than the second bearing Bp2, thus reducing surplus material for the second end wall 21B. Moreover, it becomes possible, by utilizing the space of the recessed place 21*z*1, which has a large diameter and is deep in the axial direction, to easily dispose the second bearing boss portion 21*b*2 supporting the second output shaft 52 or the second case support bearing Bc2 surrounding the second bearing boss portion 21*b*2 and, furthermore, the second support boss portion 11*b* on the transmission case main body 11 side, and it is accordingly advantageous in terms of reducing the axial dimension of the transmission device A.

Furthermore, the recess portion 21*z*2 is formed in the outside face of the second end wall 21B between the two peripherally adjacent second bearings Bp2 further radially outside than the second bearing boss portion 21*b*2, and the annular oil retaining plate 27 covering at least part of a radially outer part of the opening face of the recess portion 21*z*2 and the outer end of the second bearing Bp2 is disposed so as to extend in the peripheral direction so as to straddle the recess portion 21*z*2 and the second bearing Bp2. This enables the lubricating oil within the recess portion 21*z*2 to be biased radially outward within the recess portion 21*z*2 by means of centrifugal force and retained during rotation of the power-transmission case 20. When rotation of the power-transmission case 20 is stopped, the lubricating oil that has been retained within the recess portion 21*z*2 until then naturally falls along the oil retaining plate 27 and can be guided toward the second bearing Bp2 side, and the effect in lubricating the second bearing Bp2 can thus be enhanced.

Moreover, due to the second bearing Bp2, which does not receive a thrust load, being narrow in the radial direction and wide in the axial direction as described above, it becomes possible to form the recess portion 21*z*2, which has a large diameter and is deep in the axial direction, between the second bearings Bp2 adjacent in the peripheral direction on the outside face of the second end wall 21B supporting the second bearing Bp2, thus reducing surplus material for the second end wall 21B. The capacity for retaining lubricating oil can be enhanced by utilizing the space of the large-diameter and deep recess portion 21*z*2.

The power-transmission case 20 of the present embodiment can be inserted into the transmission case main body 11 between the mutually opposing faces of the transmission case main body 11 and the lid body 12 dividedly forming the transmission case 10, and the internal diameter of the ring gear 32 fixed to the transmission case main body 11 is set to be larger than the maximum external diameter of the wall portion (that is, the second end wall 21B), supporting the second bearing Bp2, of the power-transmission case 20. This enables the power-transmission case 20 to be assembled into the transmission case main body 11 via the opposing faces in a state in which the oil passage-forming body T or the ring gear 32 is incorporated and fixed to the transmission case main body 11 in advance. Due to the second bearing Bp2, which does not receive a thrust load, being narrow in the radial direction and it being possible to reduce the diameter of the wall portion, supporting the second bearing Bp2, of the second end wall 21B, it is also possible to achieve a small radial dimension for the ring gear 32, through which the wall portion passes, or the transmission case main body 11, to which the ring gear 32 is fixed.

In the structure in particular in which the second planetary gear portion P2 and the differential mechanism 41 overlap one another in the axial direction as in the present embodiment, reducing the diameter of the second planetary gear portion P2 is advantageous for enabling interference between the second planetary gear portion P2 and the differential mechanism 41 to be easily avoided, and reducing the diameter of the second planetary gear portion P2 compared with the first planetary gear portion P1 is also advantageous for setting a high reduction ratio for the reduction gear R. However, if the diameter of the second planetary gear portion P2 is reduced, the diameter of the ring gear 32, which meshes with the second planetary gear portion P2, is also reduced, accompanying this the internal diameter of the ring gear 32 and the external diameter of the wall portion, supporting the second bearing Bp2, of the second end wall 21B become close to each other, and it becomes difficult or hard for the wall portion to pass through the interior of the ring gear 32. In the present embodiment, since the second bearing Bp2 is a bearing that does not support a thrust load, it becomes possible to sufficiently reduce the size of the wall portion around the bearing, and the wall portion can easily pass through the interior of the ring gear 32.

An embodiment of the present invention is explained above, but the present invention is not limited to the embodiment and may be modified in a variety of ways as long as the modifications do not depart from the subject matter.

For example, the embodiment illustrates an electric motor as a power source that applies a rotational force to the input part (the sun gear 21) of the transmission device A, but instead of or in addition to an electric motor a vehicle-mounted engine may be used as the power source.

Furthermore, the embodiment illustrates a case in which the transmission device A is implemented in a transmission device for a vehicle (for example, an automobile) and the rotational force is distributed and applied between left and right driven wheels of the vehicle by means of the differential device D in the transmission device A, but in the present invention the differential device D may be used as a center differential and the rotational force may be distributed and applied between front and rear driven wheels of a vehicle. Alternatively, the transmission device A of the present invention may be implemented in a transmission device in which the reduction gear R and the differential device D are combined in various types of machines and devices other than a vehicle.

Moreover, the embodiment illustrates a case in which the first and second planetary gear portions P1, P2 of the planetary gear P are integrated with the pivot shaft 33, but the pivot shaft 33 may be a separate component from a planetary gear portion joined body in which the first and second planetary gear portions P1, P2 are joined via a linking shaft part, and in this case the planetary gear portion joined body may be rotatably fitted onto and supported on the pivot shaft 33.

Furthermore, the embodiment illustrates a case in which the differential device D includes two of the pinion gears 43, but the number of pinion gears 43 may be three or more, and in this case the pinion shaft 42 and the linking wall 21L may be disposed as appropriate according to the number of pinion gears 43.

The invention claimed is:

1. A transmission device comprising
a reduction gear having a sun gear, a ring gear that is disposed concentrically with the sun gear, a plurality of planetary gears that mesh with the sun gear and the ring gear, and a carrier that rotatably supports the plurality of planetary gears via respective pivot shafts, and
a differential device having a differential case that receives rotational power from the reduction gear and a differential mechanism that is disposed within the differential case and distributes the rotational power between a pair of output shafts while allowing differential rotation,
the sun gear and the differential case being disposed on the same axis,
wherein the carrier is dividedly formed from a first carrier portion that supports one end side of the pivot shaft and a second carrier portion that supports the other end side of the pivot shaft,
the transmission device comprises a power-transmission case that is rotatably supported on a transmission case and comprises a power-transmission case main body in which the differential case and the second carrier portion are integrated and the first carrier portion, which is joined to one end wall of the power-transmission case main body,
a bearing boss portion is integrally and projectingly provided on a side face, on the sun gear side, of said one end wall, the bearing boss portion extending toward the sun gear side and having an outer peripheral part of one of the output shafts rotatably fitted into and supported thereby,
the bearing boss portion is present at a position where the bearing boss portion overlaps the sun gear at least partially in an axial direction, and an outer peripheral part of the bearing boss portion is relatively rotatably fitted into a center hole of the sun gear, and
the first carrier portion has a boss portion protruding outward in the axial direction, and the power-transmission case is rotatably supported on the transmission case via the boss portion.

2. The transmission device according to claim 1, wherein a space part is present between said one end wall and an extremity face of the sun gear, part of the lubricating oil flowing through an interior of the power-transmission case accompanying operation of the reduction gear being able to flow into the space part.

3. The transmission device according to claim 2, wherein an oil passage is provided between mating faces of the sun gear and the bearing boss portion, one end of the oil passage communicating with the space part, and the other end of the oil passage communicating with a section between the center hole and an outer peripheral part of said one output shaft on an outer side in the axial direction of the bearing boss portion.

4. The transmission device according to claim 3, wherein a gear pump chamber is defined between opposing faces of said one end wall of the power-transmission case main body and the first carrier portion,
the planetary gear comprises a specific planetary gear portion that has gear teeth closely opposing a peripheral face of the gear pump chamber and rotates within the gear pump chamber, the specific planetary gear portion and the gear pump chamber supply lubricating oil from an outer peripheral side of the power-transmission case toward a center part side, and part of the lubricating oil thus supplied is supplied to the space part.

5. The transmission device according to claim 4, wherein the planetary gear is a two-stage planetary gear integrally having a first planetary gear portion meshing with the sun gear and a second planetary gear portion formed so as to have a smaller diameter than a diameter of the first planetary gear portion and meshing with the ring gear, and the sun gear and the first planetary gear portion mesh with each other via helical teeth,
the helical teeth having a twist angle that pushes out lubricating oil retained by a valley part of the gear teeth of the first planetary gear portion into the space part due to the sun gear and the first planetary gear portion meshing with each other.

6. The transmission device according to claim 2, wherein a gear pump chamber is defined between opposing faces of said one end wall of the power-transmission case main body and the first carrier portion,
the planetary gear comprises a specific planetary gear portion that has gear teeth closely opposing a peripheral face of the gear pump chamber and rotates within the gear pump chamber, the specific planetary gear portion and the gear pump chamber supply lubricating oil from an outer peripheral side of the power-transmission case toward a center part side, and part of the lubricating oil thus supplied is supplied to the space part.

7. The transmission device according to claim 6, wherein the planetary gear is a two-stage planetary gear integrally having a first planetary gear portion meshing with the sun gear and a second planetary gear portion formed so as to have a smaller diameter than a diameter of the first planetary gear portion and meshing with the ring gear, and the sun gear and the first planetary gear portion mesh with each other via helical teeth,
the helical teeth having a twist angle that pushes out lubricating oil retained by a valley part of the gear teeth of the first planetary gear portion into the space part due to the sun gear and the first planetary gear portion meshing with each other.

8. A transmission device comprising
a reduction gear having a sun gear, a ring gear that is disposed concentrically with the sun gear, a plurality of planetary gears that mesh with the sun gear and the ring gear, and a carrier that rotatably supports the plurality of planetary gears via respective pivot shafts, and
a differential device having a differential case that receives rotational power from the reduction gear and a differential mechanism that is disposed within the differential case and distributes the rotational power between a pair of output shafts while allowing differential rotation,
the sun gear and the differential case being disposed on the same axis,
wherein the carrier is dividedly formed from a first carrier portion that supports one end side of the pivot shaft and a second carrier portion that supports the other end side of the pivot shaft,
the transmission device comprises a power-transmission case that is rotatably supported on a transmission case and comprises a power-transmission case main body in which the differential case and the second carrier portion are integrated and the first carrier portion, which is joined to one end wall of the power-transmission case main body,
a bearing boss portion is integrally and projectingly provided on a side face, on the sun gear side, of said one end wall, the bearing boss portion extending toward the sun gear side and having an outer peripheral part of one of the output shafts rotatably fitted into and supported thereby, the bearing boss portion is present at a position where the bearing boss portion overlaps the sun gear at least partially in an axial direction, and an outer peripheral part of the bearing boss portion is relatively rotatably fitted into a center hole of the sun gear, a space part is present between said one end wall and an extremity face of the sun gear, part of the lubricating oil flowing through an interior of the power-transmission case accompanying operation of the reduction gear being able to flow into the space part, a gear pump chamber is defined between opposing faces of said one end wall of the power-transmission case main body and the first carrier portion, the planetary gear comprises a specific planetary gear portion that has gear teeth closely opposing a peripheral face of the gear pump chamber and rotates within the gear pump chamber, the specific planetary gear portion and the gear pump chamber supply lubricating oil from an outer peripheral side of the power-transmission case toward a center part side, and part of the lubricating oil thus supplied is supplied to the space part, the planetary gear is a two-stage planetary gear integrally having a first planetary gear portion meshing with the sun gear and a second planetary gear portion formed so as to have a smaller diameter than a diameter of the first planetary gear portion and meshing with the ring gear, and the sun gear and the first planetary gear portion mesh with each other via helical teeth, and the helical teeth having a twist angle that pushes out lubricating oil retained by a valley part of the gear teeth of the first planetary gear portion into the space part due to the sun gear and the first planetary gear portion meshing with each other.

9. The transmission device according to claim 8, wherein an oil passage is provided between mating faces of the sun gear and the bearing boss portion, one end of the oil passage communicating with the space part, and the other end of the oil passage communicating with a section between the center hole and an outer peripheral part of said one output shaft on an outer side in the axial direction of the bearing boss portion.

10. A transmission device comprising
a reduction gear having a sun gear, a ring gear that is disposed concentrically with the sun gear, a plurality of planetary gears that mesh with the sun gear and the ring gear, and a carrier that rotatably supports the plurality of planetary gears via respective pivot shafts, and a differential device having a differential case that receives rotational power from the reduction gear and a differential mechanism that is disposed within the differential case and distributes the rotational power between a pair of output shafts while allowing differential rotation, the sun gear and the differential case being disposed on the same axis, wherein the carrier is dividedly formed from a first carrier portion that supports one end side of the pivot shaft and a second carrier portion that supports the other end side of the pivot shaft, the transmission device comprises a power-transmission case that is rotatably supported on a transmission case and comprises a power-transmission case main body in which the differential case and the second carrier portion are integrated and the first carrier portion, which is joined to one end wall of the power-transmission case main body, a bearing boss portion is integrally and projectingly provided on a side face, on the sun gear side, of said one end wall, the bearing boss portion extending toward the sun gear side and having an outer peripheral part of one of the output shafts rotatably fitted into and supported thereby, the bearing boss portion is present at a position where the bearing boss portion overlaps the sun gear at least partially in an axial direction, and an outer peripheral part of the bearing boss portion is relatively rotatably fitted into a center hole of the sun gear, and a space part is formed between an extremity face of the sun gear and said one end wall such that the space part communicates with a section between mating faces of the sun gear and the bearing boss portion, part of lubricating oil flowing through an interior of the power-transmission case accompanying operation of the reduction gear being able to flow into the space part, an entirety of the extremity face of the sun gear directly facing said one end wall across the space part.

11. The transmission device according to claim 10, wherein an oil passage is provided on an outer peripheral face of the bearing boss portion or on an inner peripheral face of the sun gear and between mating faces of the sun gear and the bearing boss portion, one end of the oil passage communicating with the space part, and the other end of the oil passage communicating with a section between the center hole and an outer peripheral part of said one output shaft on an outer side in the axial direction of the bearing boss portion.

* * * * *